United States Patent [19]

Mashiko

[11] Patent Number: 5,394,511
[45] Date of Patent: Feb. 28, 1995

[54] COUPLING ELEMENT FOR SEMICONDUCTOR NEURAL NETWORK DEVICE

[75] Inventor: Koichiro Mashiko, Hyogo, Japan

[73] Assignee: Mitsubishi Denki Kabushiki Kaisha, Tokyo, Japan

[21] Appl. No.: 131,581

[22] Filed: Oct. 5, 1993

Related U.S. Application Data

[62] Division of Ser. No. 605,708, Oct. 30, 1990, Pat. No. 5,274,746.

[30] Foreign Application Priority Data

Dec. 26, 1989 [JP]  Japan .................................. 1-341421

[51] Int. Cl.$^6$ .......................... G06G 7/12; G06F 7/00
[52] U.S. Cl. ....................................... 395/27; 364/807
[58] Field of Search ................. 395/24, 27; 307/201; 364/807

[56] References Cited

U.S. PATENT DOCUMENTS

| | | | |
|---|---|---|---|
| 4,578,780 | 3/1986 | Baba | 365/190 |
| 4,660,166 | 4/1987 | Hopfield | 364/807 |
| 4,768,172 | 8/1988 | Sasaki | 365/230.05 |
| 4,791,607 | 12/1988 | Igarashi et al. | 365/51 |
| 4,950,917 | 8/1990 | Holler et al. | 307/201 |
| 5,021,988 | 6/1991 | Mashiko | 307/201 |
| 5,040,134 | 8/1991 | Park | 364/602 |
| 5,053,638 | 10/1991 | Furutani et al. | 307/201 |
| 5,055,897 | 10/1991 | Canepa et al. | 357/23.5 |

FOREIGN PATENT DOCUMENTS

| | | | |
|---|---|---|---|
| 53-53522 | 12/1979 | Japan | 365/230.05 |
| 62-76092 | 4/1987 | Japan | 365/230.05 |

OTHER PUBLICATIONS

Graf et al., "A CMOS Associative Memory Chip Based on Neural Networks" 1987 IEEE Intl. Solid-State Circuits Conf., 1987, 304–306.

Kub et al., "Programmable Analog Vector-Matrix Multipliers," IEEE Jour. of Solid-State Circuits, Feb. 1990, 207–214.

Hans P. Graf et al., "VLSI Implementation of a Neural Network Model", *Computer*, Mar. 1988, pp. 41–49.

Joshua Alspector et al., "A Neuromorphic VLSI Learning System", *Advanced Research in VLSI*, 1987, pp. 313–349.

H. P. Graf, "A CMOS Associative Memory Chip Based on Neural Network", 87 ISSCC Digest of Technical Papers, Feb. 1987, pp. 304–305.

*Primary Examiner*—Robert W. Downs
*Attorney, Agent, or Firm*—Lowe, Price, LeBlanc & Becker

[57] ABSTRACT

A neural network device includes internal data input lines, internal data output lines, coupling elements provided at the connections of the internal data input lines and the internal data output lines. The coupling elements couple, with specific programmable coupling strengths, the associated internal data input lines to the associated internal data output lines. In a program mode, the internal data output lines serve as signal lines for transmitting the coupling strength information. Each of the coupling elements includes storage elements, circuitry for writing a signal potential on an associated internal data output line, and circuitry for supplying a stored signal for a storage element into an associated internal data output line.

17 Claims, 15 Drawing Sheets

THRESHOLD FUNCTION

SIGMOID FUNCTION

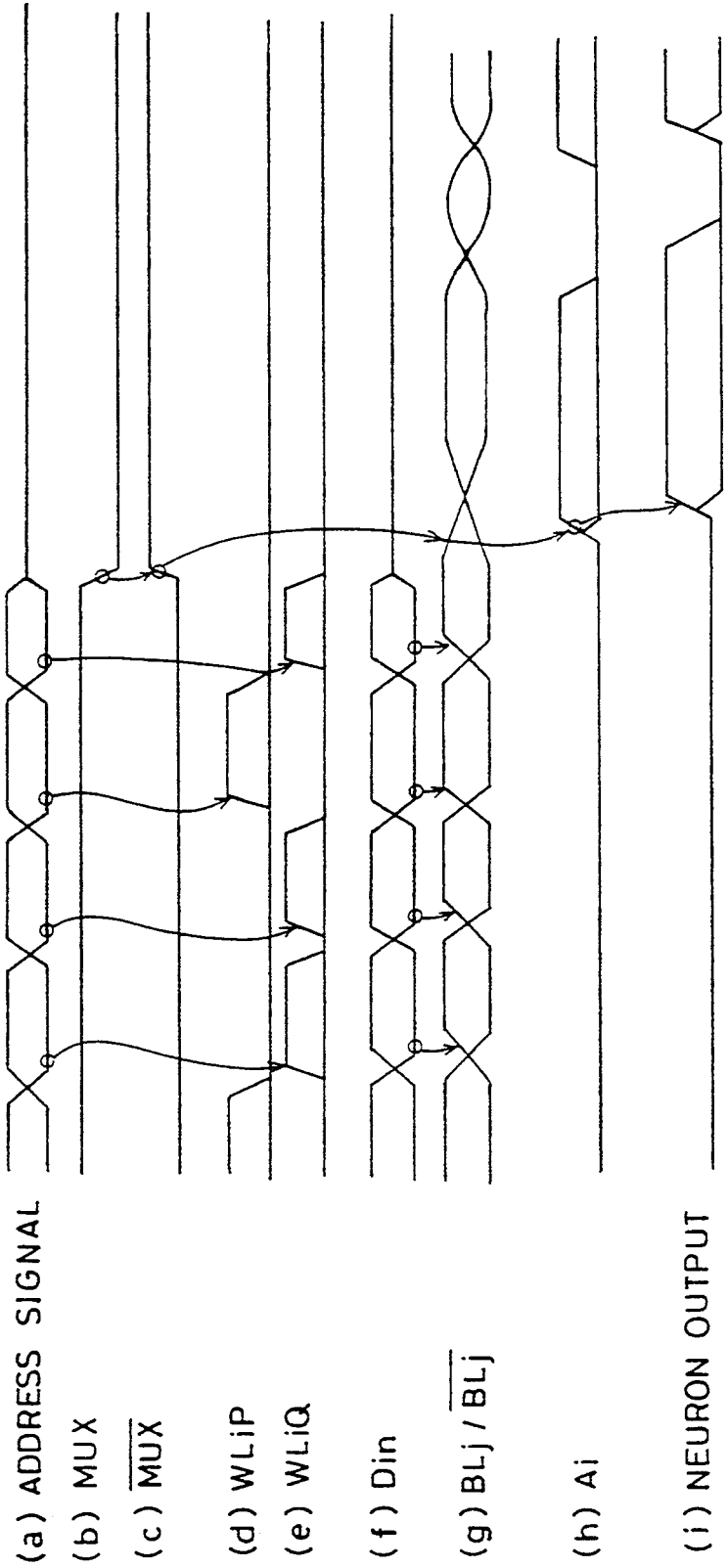

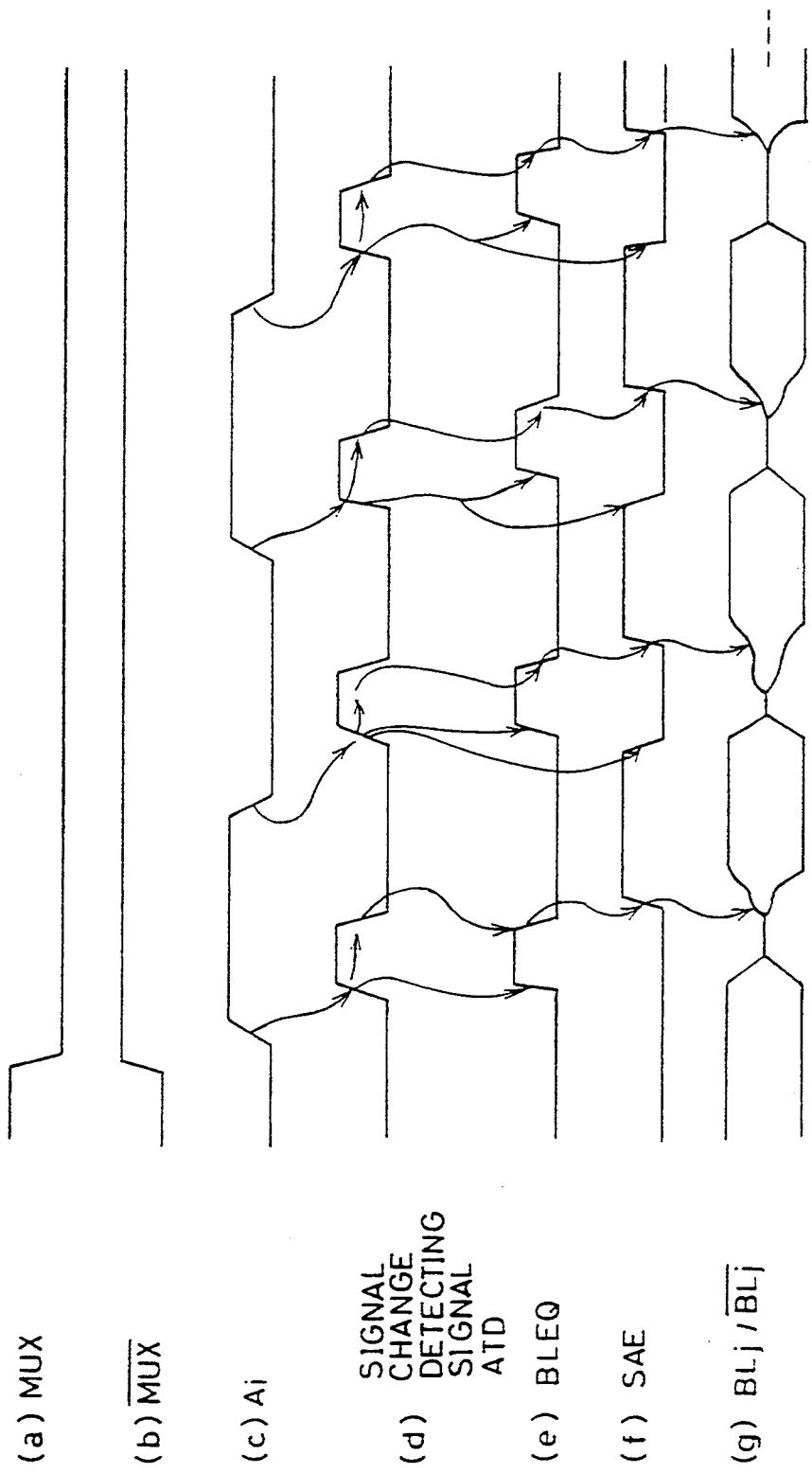

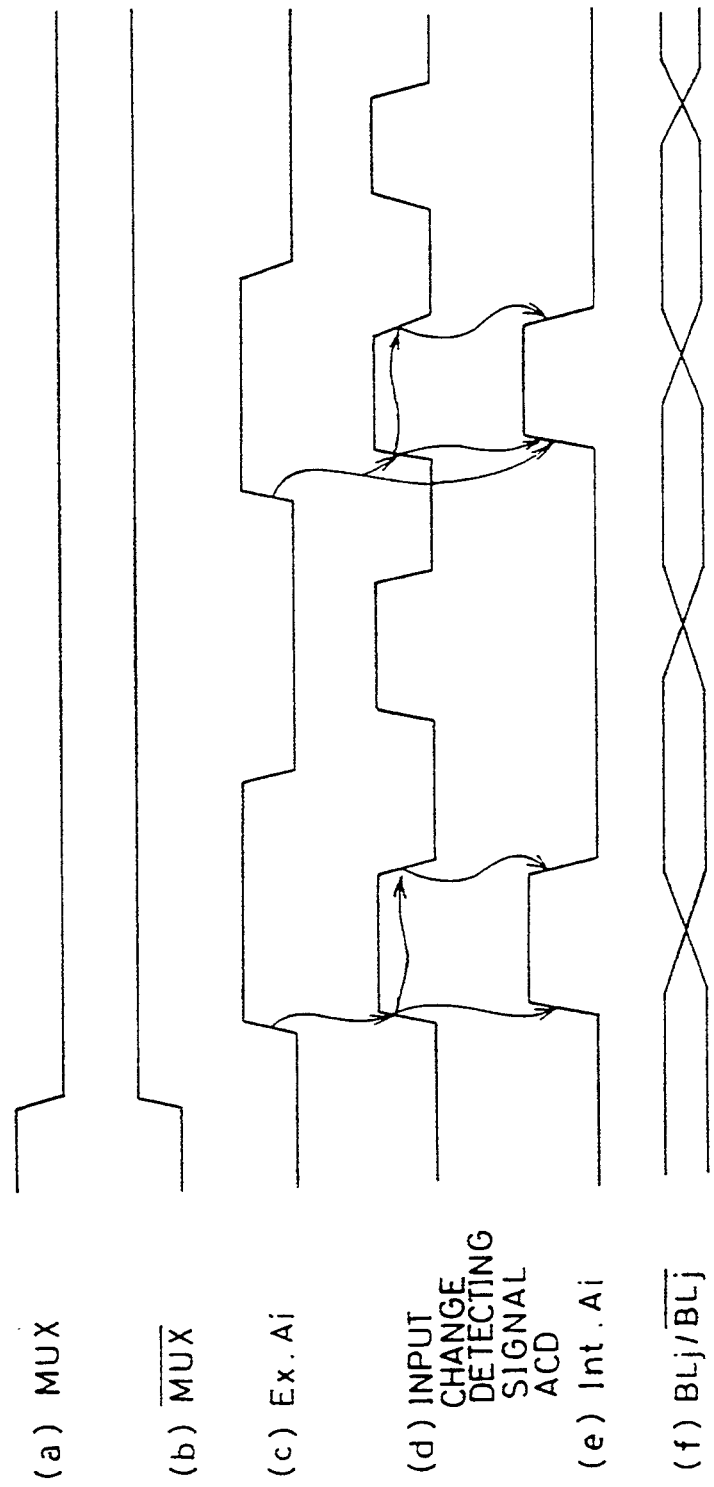

COUPLING ELEMENT FOR SEMICONDUCTOR NEURAL NETWORK DEVICE

This application is a division of application Ser. No. 07/605,708, filed Oct. 30, 1990, and allowed Jun. 11, 1993, now U.S. Pat. No. 5,274,746, issued Dec. 28, 1993.

CROSS REFERENCE

This application is also related to copending application U.S. Pat. No. 5,202,956, and its divisional application, Ser. No. 08/005,454, filed Jan. 19, 1993 under the name of the same inventor, K. Mashiko, and assigned to the same applicant, Mitsubishi Denki.

BACKGROUND OF THE INVENTION

1. Field of the Invention

The present invention generally relates to semiconductor neural networks, and more particularly, to coupling elements which couple with specific coupling strengths (synapse loads) internal data input lines to internal data output lines, and to improvements of a neural network driving method.

2. Description of Background Art

In recent years, a variety of circuits modeled on a neuron of a human being has been contrived. Among such neuron models, there is one called a Hopfield's model. This Hopfield's model will be briefly described below.

In FIG. 1, there is shown a schematic structure of a unit modeled on a neuron. A unit i comprises an input portion A for receiving signals from other units k, j, and the like, a converting portion B for converting applied input signals according to a certain rule, and an output portion C for outputting the conversion results. The input portion A has a weight (synapse load) W for each input unit which indicates a coupling strength between the units. Therefore, an input signal Sk from the unit k is loaded with a weight Wik at the input portion A before transmitted to the converting portion B. This weight Wik can take any of positive and negative values or 0.

The converting portion B make a total sum "net" of inputs S that have been loaded with the weights W (when generically termed, the weight is referred to as "W" hereinafter) undergo a predetermined function f for output. Output Si from the unit i at the time t is given as:

$$Ui = \text{net}(i) = \sum_j Wij \cdot Sj$$

$$Si = f[Ui(t)].$$

As the function f, a threshold function shown in FIG. 2A or a sigmoid function shown in FIG. 2B is often used.

The threshold function shown in FIG. 2A is a unit step function having characteristics that when the total sum "net (i)" of inputs becomes larger than a threshold value $\theta$, "1" is output, and when it does reach the threshold value, "0" is output.

The sigmoid function shown in FIG. 2B is a non-linear monotonously increasing function and given by the following expression:

$$f = 1/[1 + \exp(-\text{net}(i))].$$

The range of values of the sigmoid function is from 0 to 1. Therefore, as the total sum "net (i)" of inputs becomes smaller, the output approaches to "0", and as the total sum "net (i)" of inputs becomes larger, the output approaches to "1". When the total sum "net (i)" of inputs is "0", this sigmoid function outputs "0.5".

Another function obtained by adding a predetermined threshold value $\theta$ to the above-mentioned sigmoid function, as given by the following expression, may be employed.

$$f = 1/[1 + \exp(-\text{net}(i) + \theta)]$$

The unit model above is modeled on a vital cell which receives stimuli from other neurons and fires when a total sum of the stimuli exceeds a certain value. The Hopfield's model provides an operational model to a network configured of a plurality of such neuron units.

In the expressions above, when one neuron is initialized, state of all the remaining neuron units is determined in principal by applying the above-mentioned two dynamic equations to each neuron unit and solving them simultaneously. When the number of units increases, however, it is almost impossible to investigate and catch hold of state of one unit after another, and to program weights and bias values such that an optimal solution can be provided for a target problem. Therefore, Hopfield has introduced, in place of state of each unit, an energy function E as a quantity for representing entire characteristics of a neural net, which is defined as follows.

$$E = -(1/2) \sum_{i,j} Wij \cdot Si \cdot Sj - \sum_i Ii \cdot Si$$

In the expression above, Ii is a self-bias value specific to the unit i. Hopfield has demonstrated that when the weight (synapse load) Wij has a symmetry shown as Wij=Wji, each unit changes its own state such that the above-mentioned energy function E always takes minimum values (more correctly, local minima), and proposed that this model be applied to programming of the weight Wij. A model according to the energy function E as described above is called a Hopfield's model. The expression above are often restated for a discrete model as:

$$Ui(n) = \sum_j Wij \cdot Sj(n) + Ii.$$

$$Si(n + 1) = f[Ui(n)].$$

In the expression above, n is a discrete time. Hopfield himself has demonstrated that the Hopfield's model above can work with good accuracy especially when the function f indicating input/output characteristics has a steep gradient (which is approximate to a unit step function in which most of the outputs take values close to either "0" or "1").

Neural networks have been configured according to this Hopfield's model in VLSI (Very Large Scale Integration) technology. An example of such a neural network is disclosed in "Computer", March, 1988, pp. 41 to 49, published by IEEE (Institute of Electrical and Electronics Engineers), or in "A CMOS Associative Memory Chip Based on Neural Network", by H. P.

Graf in "87 ISSCC, Digest of Technical Papers", 1987 February, pp. 304 to 305, published by IEEE.

In FIG. 3, there is shown the entire schematic structure of a conventional integrated neural network circuit disclosed in the documents above. Referring to FIG. 3, the conventional integrated neural network circuit comprises a resistive matrix 100 having resistive coupling elements with predetermined weights arranged in a matrix, and an amplifying circuit 101 for amplifying potentials on internal data input lines included in the resistive matrix 100 and feeding back those amplified signals to the input portions of the respective resistive coupling elements. The resistive matrix 100 comprises the internal data input lines and internal data output lines arranged in a direction orthogonally intersecting the internal data input lines, as will be described in detail later. Interconnections between the internal data input lines and the internal data output lines made through the resistive coupling elements can be programmed by programming resistance values of the resistive coupling elements.

To select resistive coupling elements contained in the resistive matrix 100, there are provided a row decoder 102 and a bit decoder 103. The row decoder 102 selects one row of coupling elements in the resistive matrix 100. The bit decoder 103 selects one column of coupling elements in the resistive matrix 100.

To write coupling strength information in the resistive coupling elements selected by the row decoder 102 and the bit decoder 103, there are provided an input-/output data register 104 for temporarily latching applied data, a multiplexer 105 for connecting the input-/output data register 104, according to write/read mode of the data, to either the internal data input lines or the internal data output lines in the resistive matrix 100, an interface (I/O) 106 for connecting the input-/output data register 104 to the outside of the device. This neural network is integrated on a semiconductor chip 200.

The row decoder 102 and the bit decoder 103 select a single resistive coupling element, to which information of coupling strength is written in through the input-/output data register 104 and the multiplexer 105. Thus, states of the respective coupling elements contained in the resistive matrix 100 are determined, or interconnection states of the internal data input lines and the internal data output lines can be programmed in this manner.

FIG. 4 shows more specifically an example of structure of the resistive matrix 100 shown in FIG. 3. Referring to FIG. 4, the resistive matrix 100 comprises internal data input lines A1 to A4 and internal data output lines B1 and $\overline{B1}$, B2 and $\overline{B2}$, B3 and $\overline{B3}$, and B4 and $\overline{B4}$. At the connections between the internal data input lines A1 to A4 and the internal data output lines B1 and $\overline{B1}$ to B4 and $\overline{B4}$, there are provided resistive coupling elements 1. Each coupling element 1 can take three states; "open state", "excitatory state" and "inhibitory state". The state of each resistive coupling element 1 can be externally programmed according to an applied problem. Though in FIG. 4, those resistive coupling elements 1 that are in the open state are not shown, all the connections between the internal data input lines and the internal data output lines are provided with the resistive coupling elements 1. Each resistive coupling element 1 transmits, according to its own programmed state, signal potential level on the corresponding internal data output line Bi ($\overline{Bi}$) onto the corresponding internal data input line Aj.

For the internal input lines A1 to A4, there are provided amplifying circuits C1 to C4 for amplifying signal potentials on the corresponding internal data input lines and transmitting the amplified potentials to the corresponding internal data output lines. Each of the amplifying circuits C1 to C4 has two inverting amplifiers 2a and 2b connected in series. The inverting amplifier 2a inverts potential on the input line Ai and transmits the inverted potential onto the internal data output line Bi. The inverting amplifier 2b transmits the signal potential on the input line Ai onto the complementary internal data output line $\overline{Bi}$.

Each of the resistive coupling elements 1 couples output of one amplifier Ci to input of another amplifier Cj. A specific structure of the resistive coupling element 1 is shown in FIG. 5.

Referring to FIG. 5, the resistive coupling element 1 comprises current limiting resistive elements R+ and R−, random access memory cells 150 and 151 for storing coupling strength information, switching elements S1 and S2 responsive to an output signal of an amplifying circuit Ci to be turned on/off, and switching elements S3 and S4 responsive to the information stored in the random access memory cells 150 and 151 to be set in the on/off state. The resistive element R+ has one terminal connected to a supply potential $V_{DD}$. The resistive element R− has one terminal connected to another supply potential (for example, ground potential) $V_{SS}$. The switching element S1 is controlled by output of an inverting amplifier 2b for its on/off. The switching element S2 is turned on/off according to the information stored in the random access memory cell 150. The switching element S3 is set in the on/off state according to the information stored in the random access memory cell 151. The switching element S4 is controlled by output of another inverting amplifier 2a for its on/off.

In order to write information indicative of coupling strength into the random access memory cells 150 and 151, word lines WLP and WLQ and a bit line BL are provided. The random access memory cell 150 is provided at the crossing of the word line WLP and the bit line BL. The random access memory cell 151 is provided at the crossing of the word line WLQ and the bit line BL. The random access memory cell 150 stores information indicative of "excitatory state" and the random access memory cell 151 stores information indicative of the "inhibitory state". Thus, two word lines are provided for a single coupling element. The word lines WLP and WLQ receive row select signals from the row decoder 102 shown in FIG. 3. The bit line BL is selected by the bit decoder 103 shown in FIG. 2 to receive coupling strength information. The word lines WLP and WLQ are provided in parallel with the internal data input line Ai, and the bit line BL is in parallel with the internal data output line Bi in the resistive matrix.

In the structure shown in FIG. 5, output of an amplifying circuit Ci does not directly supply current to a corresponding internal data input line, thereby reducing output load capacitance of the amplifying circuit Ci. The coupling element 1 can selectively take three states, as described above, according to the programmed states of the random access memory cells 150 and 151. That is, the "excitatory state" where the switching element S2 is in on the state (active state), the "inhibitory state" where the switching element S3 is in the on state (active state), and the "open (don't care) state" where both switching elements S2 and S3 are in the off state (non-active state).

When potential levels on output lines Bi and $\overline{Bi}$ of an amplifying circuit Ci coincide with a programmed coupling state of a certain resistive coupling element 1, current flows into a corresponding data input line Ai either from the supply potential $V_{DD}$ or from the other supply potential (ground potential) $V_{SS}$. When the programmed coupling state of the resistive coupling element 1 is "open, no current flows through the input line Ai irrespective of output state of the amplifying circuit Ci.

When the above-mentioned circuit model is compared to a neuron model, the amplifying circuit Ci corresponds to a neuron body (the converting portion B in FIG. 1). The signal lines A1 to A4, and B1 to B4 and $\overline{B1}$ to $\overline{B4}$ correspond to the data input portion A and the data output portion C (or dendrite and axon) shown in FIG. 1, respectively. The resistive coupling element 1 corresponds to a synapse loading portion which provides weighting between neurons. Now, operation of the resistive matrix will be briefly described.

The model shown in FIG. 4 is often called a connectionists' model. In this model, each neuron unit (amplifying circuit Ci) simply performs thresholding of an input signal, or outputs a signal corresponding to magnitude of the input signal compared with a predetermined threashold value. Each resistive coupling element couples output of one amplifying circuit Ci to input to another amplifier circuit Cj. Therefore, state of each amplifying circuit Ci is determined by states of all the remaining circuits Cj ($i \neq j$). When a certain amplifying circuit Ci detects current on the corresponding input line Ai (i=1 to 4), output of the amplifying circuit Ci at that time is given as:

$$Vout(i) = f\left(\sum_j Ij\right) = f\left(\sum_j (Vout)(j) - Vin(j)\right)Wij$$

In the expression above, Vin (j), and Vout (j) represent input and output voltages, respectively, of the amplifying circuit Cj connected to an internal data input line Aj, Ij represents current flowing through a single resistive coupling element, Wij represents conductance of a resistive coupling element which couples the amplifying circuit Ci connected to the internal data input line Ai to the amplifying circuit Cj conected to the internal data input line Aj. The output voltage Vout of the amplifying circuit Ci is determined by transfer characteristics of the amplifying circuit Ci itself. The voltage applied to the amplifying circuit Ci from the input line Ai is given by a total sum of currents flowing into the input line Ai. This input voltage is adjusted such that the total current flowing in this network becomes 0. In such state, the total energy of the neural network reaches local minima.

Each of the amplifying circuits Ci is constituted of, for example, a CMOS inverter. When the CMOS inverter has a high input impedance and a non-linear monotonously increasing threshold function as described above, the following relational expression can be obtained from the above-described condition that the total current becomes 0.

$$\sum_i Iij = \Sigma \Delta Vij/Rij = 0$$

In the expression above, Iij represents current flowing through the resistors of a resistive coupling element controlled by output of the amplifying circuit Ci connected to the input line Ai. $\Delta Vij$ is a potential difference at the resistive coupling element and given by:

$$\Delta Vij = Vin(j) - V_{DD} \quad \text{excitatory coupling}$$
$$= Vin(j) - V_{SS} \quad \text{inhibitory coupling}$$

Rij represents resistance of the resistive coupling element and is given by R+ or R−. Therefore, the voltage Vin (i) is a total sum of all the outputs of the amplifying circuits connected to the data input line Ai.

The above-mentioned operation is analogical computation. This analogical computation is performed at a time in parallel in the resistive matrix 100. However, both input data and output data are digital data. Subsequently, a practical computing operation will be described with reference to FIG. 4.

Input data is applied to the respective internal data input lines A1 to A4 through a register 104. The respective internal data input lines A1 to A4 are charged to potential levels corresponding to the input data and thus the neural network is initialized.

Output potentials of the amplifying circuits C1 to C4 change according to charging potentials applied to the data input lines A1 to A4. These potential changes of the respective amplifying circuits C1 to C4, or potential changes on the internal data output lines are fed back to the internal data input lines A1 to A4 through the corresponding resistive coupling elements. The potential levels, or current values fed back to the internal data input lines A1 to A4 are defined by the programmed states of the respective resistive coupling elements. More specifically, when a resistive coupling element has been programmed to be in the "excitatory state", current flows from the supply potential $V_{DD}$ to a data input line Ai. On the other hand, when the resistive coupling element has been programmed to be in the "inhibitory state", current flows from the supply potential $V_{SS}$ to the data input line Ai. Such operations proceed in parallel except for those resistive coupling elements that have been set in the open state. Thus, currents flowing into the data input line Ai are analogically added together, causing a potential change on the data input line Ai. When the changed potential on the data input line Ai goes over a threshold voltage of the corresponding amplifying circuit Ci, output potential of this amplifying circuit Ci changes. By repeating such operation, output potential of each amplifying circuit Ci changes to meet the above-mentioned condition that the total sum of currents becomes 0, until the network settles in a state satisfying the above-described expression of the stable state.

After this neural network has been stabilized, the output voltage of the amplifying circuit Ci is stored in a register (the input/output register 104 shown in FIG. 3) and then read out. A determination as to whether the network has been stabilized or not is made, depending on whether or not a predetermined time has passed since the data input or by directly comparing succeeding output data stored in the output register and detecting difference therebetween in terms of time. In the latter case, it is determined that the network has been stabilized when differences between the compared output data get smaller than a predetermined value, and then output data is provided.

This neural network outputs such output data as allowing energy of the neural network to settle in minimum values (or local minima). Thus, according to the programmed states of the resistive coupling elements, the resistive matrix 100 stores some patterns or data and can determine match/mismatch between input data and the stored pattern or data. Therefore, such a neural network can also serve as an associative memory circuit or a pattern discriminator.

A structure obtained by removing the feedback paths between the internal data output lines Bi and $\overline{Bi}$ and the internal data input lines Aj in the resistive matrix 100 shown in FIG. 4 has been known as a perception circuit of a single layer. This perceptron circuit can have a simplified learning algorithm, and when multi-layered, a flexible system can be implemented.

FIG. 6 shows a specific example of a possible structure of the coupling element shown in FIG. 5. In FIG. 6, there is shown structure of a coupling element Tij disposed at a location of i row and j column in the resistive matrix, or at the connection of an internal data input line Ai and an internal data output line Bj, and the parts equivalent or corresponding to those in the conceptual structure of the coupling element shown in FIG. 5 are denoted by the same reference numerals.

In FIG. 6, each of the switching elements S1 to S4 is constituted of an insulated gate field effect transistor (MIS transistor). The internal data input line is formed of complementary signal lines Ai and $\overline{Ai}$. Data complementary to each other are transmitted from the input register (see FIG. 3) onto these paired complementary signal lines.

The bit line BL is constituted of a complementary bit line pair of BLj and $\overline{BLj}$ receiving complementary data.

The random access memory cell(RAM1) 150 comprises two inverting amplifiers IN1 and IN2 for storing coupling strength information that are anti-parallel to each other, or cross-coupled with the input portion of one amplifier connected to the output portion of the other, and MIS transistors TR1 and TR2 responsive to a signal potential on the word line WLiP for being turned on to connect the input portions of the inverting amplifiers IN1 and IN2 to the bit lines BLj and $\overline{BLj}$, respectively. The inverting amplifiers IN1 and IN2 constitute a latch circuit which stores coupling strength information. The information latched by the latch circuit is transmitted through a node N1 to the control electrode (gate electrode) of the switching element(MIS transistor) S2.

Likewise, the random access memory cell(RAM2) 151 comprises inverting amplifiers IN3 and IN4 constituting a latch circuit, and MIS transistors TR3 and TR4 responsive to a signal potential on the word line WLiQ for being turned on to connect the input portions of the inverting amplifiers IN3 and IN4 to the bit lines BLj and $\overline{BLj}$, respectively. The information stored in the latch circuit constituted of the inverting amplifiers IN3 and IN4 is applied through a node N2 to the control electrode (gate electrode) of the switching element(MIS transistor) S3. In the following, operation of writing the coupling strength information into this coupling element Tij will be briefly described.

When the word line WLiP is selected by the row decoder 102 (see FIG. 3), the MIS transistors TR1 and TR2 are turned on together, connecting the input portions of the inverting amplifier IN1 and IN2 to the bit lines BLj and $\overline{BLj}$, respectively. Subsequently, data of "0" and "1" are transmitted onto the bit line BLj and its complementary bit line $\overline{BLj}$, respectively. Then, due to the latching function of the cross-coupled or anti-parallel inverting amplifiers IN1 and IN2, data of "1" is stored at the node N1. Thus, the "excitatory state" of the coupling element Tij is programmed.

When this coupling element Tij is to be programmed in the "inhibitory state", the word line WLiQ is selected and data of "0" and "1" are transmitted onto the bit line BLj and the complementary bit line BLj, respectively. Due to the latching function of the cross-coupled inverting amplifiers IN3 and IN4, data of "1" is latched at the node N2. When the coupling element Tij is to be programmed to take the "open state", the word lines WLiP and WLiQ are sequentially selected and data of "1" and "0" are transmitted onto the bit line BLj and the complementary bit line $\overline{BLj}$, respectively. As a result, data of "0" are latched at the nodes N1 and N2. Meanwhile, information of "1" represents an "H"-level signal and information of "0" represents an "L"-level signal.

While the coupling element shown in FIG. 6 is configured such that signal potentials on the internal data input lines are transmitted to the internal data output lines, the structure becomes equivalent to that of the coupling element shown in FIG. 5 if it is adapted such that signals on the internal data output lines Bj are fed back to the internal data input lines Ai ($\overline{Ai}$).

FIG. 7 shows the entire structure of a neural network obtained by arranging the coupling elements as shown in FIG. 6 in a matrix of 4 rows and 4 columns.

In FIG. 7, in order to write coupling strength information into the coupling elements, there are provided a RAM I/O 106b serving as interface for transmitting and receiving data to and from outside of the device, selective gates 111 responsive to a column select signal (column decode signal) from the bit decoder 103 for connecting the selected column to internal data buses I/O and $\overline{I/O}$, data registers 104 provided corresponding to the respective columns for amplifying and latching the applied data, and transfer gates 112 responsive to an operation mode indicating signal MUX for connecting the data registers 104 to the resistive matrix 100.

A column select line is formed of a complementary bit line pair of BL and $\overline{BL}$ and, therefore, the selective gates 111 and the transfer gates 112 comprise one pair of MIS transistors for each column. Among the MIS transistor pairs contained in the selective gates 111, one pair of MIS transistors are rendered conductive in response to the column select signal from the bit recorder 103. The transfer gates 112 are rendered conductive in a program mode where information of coupling strength is written in the respective coupling elements of the resistive matrix 100, and turned off in a practical processing operation where input data to be processed by the neural network is externally applied.

The RAM I/O 106b transmits a complementary data pair to the internal data buses I/O and $\overline{I/O}$.

Word lines WL1P to WL4P and WL1Q to WL4Q are connected to the output portion of the row decoder 102 to receive a row select signal from the row decoder 102.

An input register 106a, which corresponds to the input/output register in FIG. 3 or the data input portion of an interface, has its output portion connected to complementary internal input data line pairs of A1 and $\overline{A1}$ to A4 and $\overline{A4}$ for transmitting complementary input signals (input data signals to be processed).

Amplifying circuits 101 are provided corresponding to the respective internal data output lines B1 to B4 to amplify signal potentials thereon.

In writing the information of coupling strength, the signal MUX attains the "H" level indicative of the active state so that the transfer gates 112 are rendered conductive. Subsequently, the row decoder 102 and the bit decoder 103 select one row and one column, respectively, and then desired information is written in the storage elements of the coupling element located at the connection of the selected row and column. At this time, the data register 104 latches the complementary data transmitted to the bit lines BL and $\overline{BL}$ and at the same time, the data are written in the coupling elements. Though each storage element has a latch circuit constituted of cross-coupled inverters, the data register 104 has a larger driving capability than the latching capability of the storage elements. Therefore, desired coupling strength information is written in the respective coupling elements.

In operation, the signal MUX falls to the "L" level indicative of the "inactive state", the transfer gates 112 are turned off. Subsequently, a neuron input signal, which has been applied from outside of the chip and temporarily stored in the input register 106A, is transmitted to the internal data input lines Ai and $\overline{Ai}$ as an input signal to be processed in the resistive matrix 100. In the resistive matrix 100, according to the combination of the information stored in the RAM1 and RAM2 contained in the respective coupling elements Tij, charging and discharging operations are performed for the internal data output lines Bi in parallel. Voltage values on the internal data output lines Bi are detected and amplified by the amplifying circuits 101 and the results are developed as output signals.

In the structure above, a non-Hopfield's type neural network has been described where paths for feeding back signal voltages on the internal data signal lines to the resistive matrix are not provided. However, also a Hopfield's type neural network can be configured in the same manner if only paths for feeding back the internal data output lines Bi to the internal data input lines Ai and $\overline{Ai}$ are added to the above-described structure.

A conventional coupling element comprises storage element portions for storing coupling strength information and a current supplying element portion responsive to the information stored in the storage element portions and a signal potential on an internal data input line (or internal data output line) for transmitting a predetermined current to an internal data output line (or internal data input line). Therefore, as the number of elements constituting a coupling element increases with its structure getting more complicated, the area occupied by the coupling element becomes larger.

Further, since the word lines and the bit lines for writing coupling strength information in the storage element portions and the internal data input lines and the internal data output lines for transferring data to be processed are provided individually, a large number of signal lines are required, occupying a large area. Furthermore, since the large number of signal lines have to be provided in a small area, layout of the signal lines becomes complicated, resulting in a significant obstacle in achieving higher integration. Thus, the provision of a large number of signal lines, combined with complicity of the structure of coupling element, brings about disadvantages also in terms of production yield.

Additionally, in the conventional semiconductor neural networks, the input data signal continues to be applied for a significant time to sufficiently charge or discharge the internal data inputs lines to the "H" or "L" level, so that when the internal data input lines and the internal data output lines are charged or discharged in operation, potential of each signal line may make a full-swing. As a result, the consumption power becomes large and fast operability can not be achieved, while taking a longer processing time (or convergence time).

A structure of synapse load expressive unit is disclosed in "A Neuromorphic VLSI Learning System" by J. Alspector et al, pp. 323 to 325 in "Advanced Research in VLSI, 1987" published by MIT Press, where an input signal and an output signal of neurons are coupled together through a transistor which is turned on/off under control of a flip-flop storing a synapse coupling strength.

SUMMARY OF THE INVENTION

An object of the present invention is to provide an improved semiconductor neural network from which disadvantages of the conventional semiconductor neural networks as described above have been eliminated.

Another object of the present invention is to provide a semiconductor neural network which comprises coupling elements of a simple structure.

Still another object of the present invention is to provide a semiconductor neural network whose resistive matrix has a reduced number of signal lines.

A further object of the present invention is to provide a semiconductor neural network operable at a high speed and with low consumption power, and a driving method thereof.

A semiconductor neural network according to the present invention comprises a plurality of internal data input lines, a plurality of internal data output lines, a plurality of word lines, bit lines shared with the internal data output lines, and coupling elements provided at the connections of the bit lines and the word lines.

A coupling element comprises storage means constituted of cross-coupled or anti-parallel inverting amplifiers for storing information indicative of a specific coupling strength, means responsive to a signal potential on a corresponding word line for being rendered conductive to write a signal potential on a corresponding bit line (internal data output line) in the storage means, and means responsive to a signal potential on a corresponding internal data input line for being rendered conductive to transmit the information stored in the storage means onto a corresponding internal data output line (bit line).

The coupling element has first and second storage means.

The bit lines have a structure constituted of complementary bit line pairs and thus also the internal data output lines have a structure constituted of complementary internal data output line pairs. The information stored in the first storage means is transmitted onto first internal data output lines of the complementary internal data output line pairs, and the information stored in the second storage means is transmitted onto second internal data output lines (second bit lines) of the bit line pairs (internal data output line pairs).

The semiconductor neural network according to the present invention further preferably comprises means for detecting a time of change of an externally applied input data signal, converting, in response to a detection signal, the externally applied input data signal into a one-shot pulse signal and transmitting the converted signal onto the internal data input lines.

The semiconductor neural network according to the present invention further preferably comprises means responsive to the signal detecting a change of the externally applied input data for equalizing potentials on the internal data output lines, and means responsive to the signal detecting a change of the input data signal for activating sense amplifiers provided to the internal data output lines.

As previously described, since the same signal lines are shared by the bit lines and the internal data output lines, a reduction in the number of signal lines becomes possible. For the coupling elements, since the information stored in the storage means is transmitted to the internal data output lines in response to signal potentials on the internal data input lines, the number of elements constituting a coupling element can be reduced. Thus, coupling elements occupying only a small area can be obtained.

Further, since in a coupling element, one out of the two storage means is connected to a positive internal data output line and the other storage means has its storage node connected to a negative bit line (internal data output line), a device structure where commonly use of the bit line pairs and the internal data output line pairs is realized can be obtained.

Furthermore, by converting the internal input data signal into a one-shot pulse signal, the full-swing of potentials on the internal signal lines can be prevented. As a result, low power consumption and fast operability can be achieved, while preventing inversion of the storage information in the storage elements constituted of inverting amplifiers. Thus, stable operation of the storage elements in the coupling elements is assured.

Furthermore, by equalizing potentials on the internal data output line pairs and activating the sense amplifiers in response to a change of the internal input data signal, low power consumption as well as fast operability can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a signal waveform chart showing operation of the semiconductor neural network shown in FIGS. 8 and 9.

FIG. 19 is a signal waveform chart showing operation of the circuit shown in FIG. 18.

FIG. 21 is a signal waveform chart showing operation of the circuit shown in FIG. 20.

DESCRIPTION OF THE PREFERRED EMBODIMENTS

Figure 1:
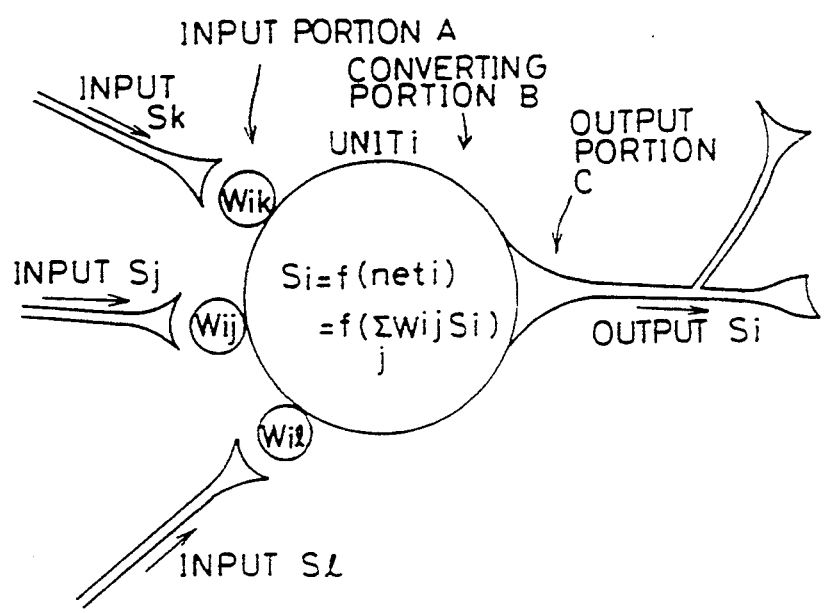
FIG. 1 is diagram showing a neuron model.
Figure 2A:
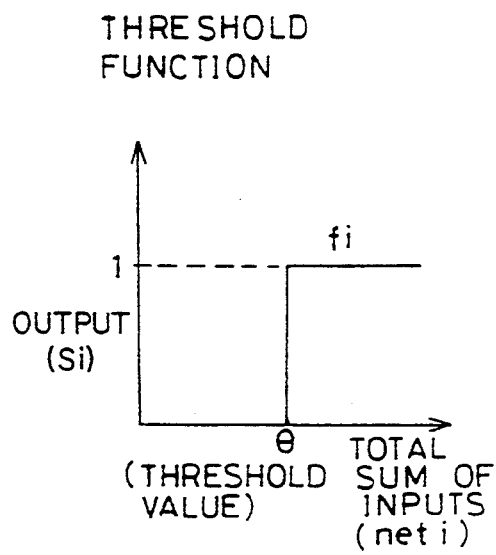
FIGS. 2A and 2B are diagrams showing examples of threshold function of a neuron.
Figure 2B:
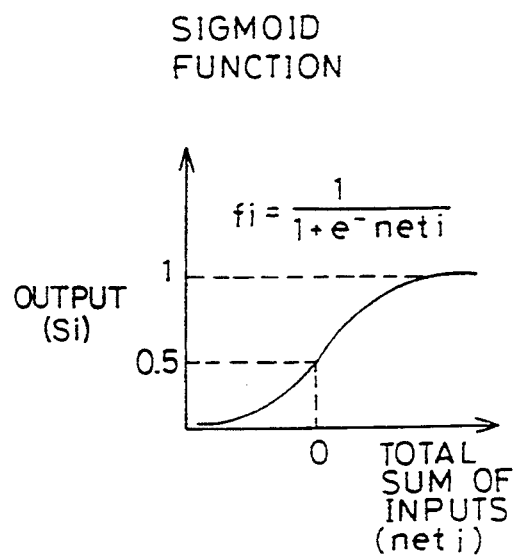
Figure 3:
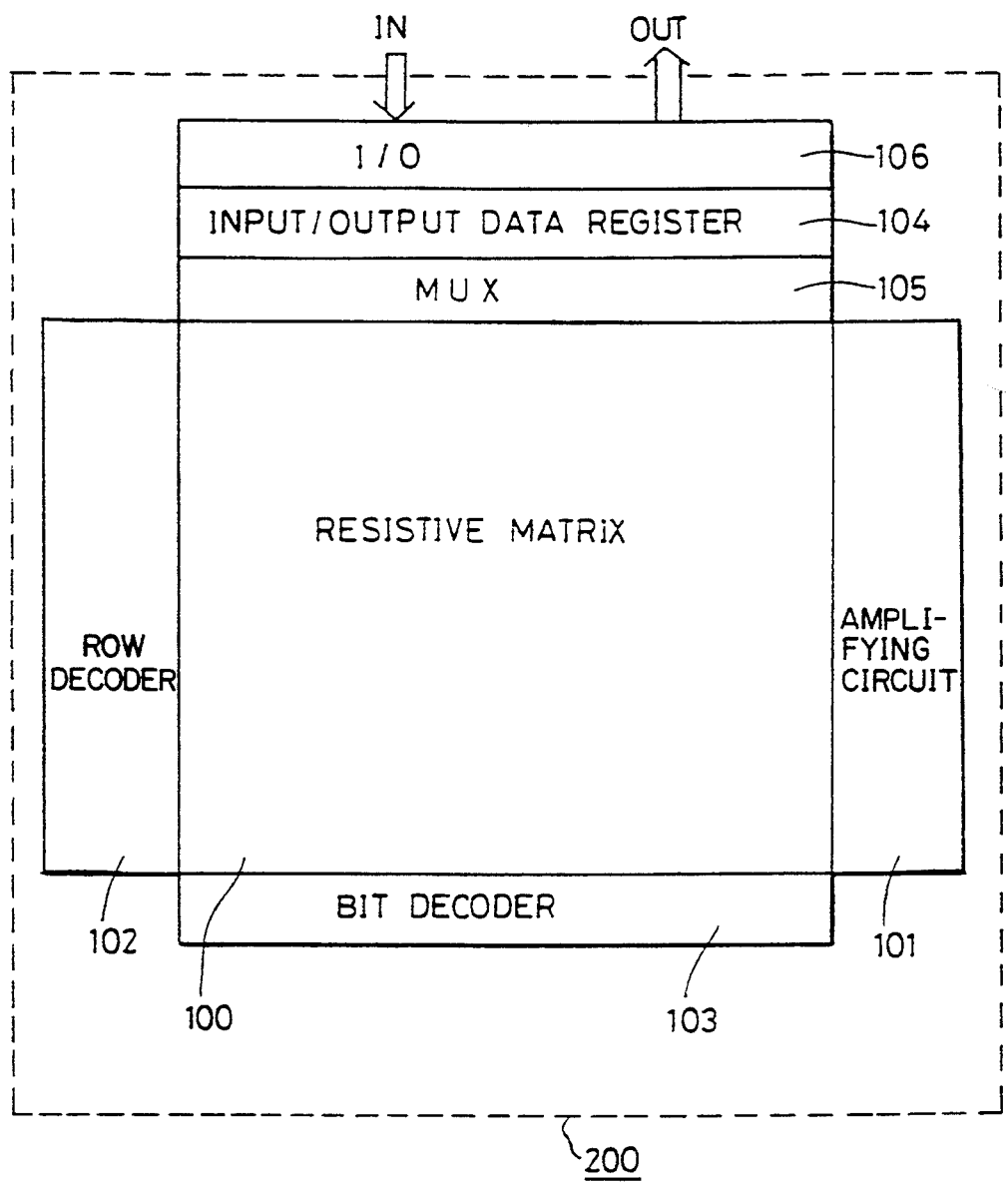
FIG. 3 is a diagram showing conceptual structure of a conventional semiconductor neural network chip.
Figure 4:
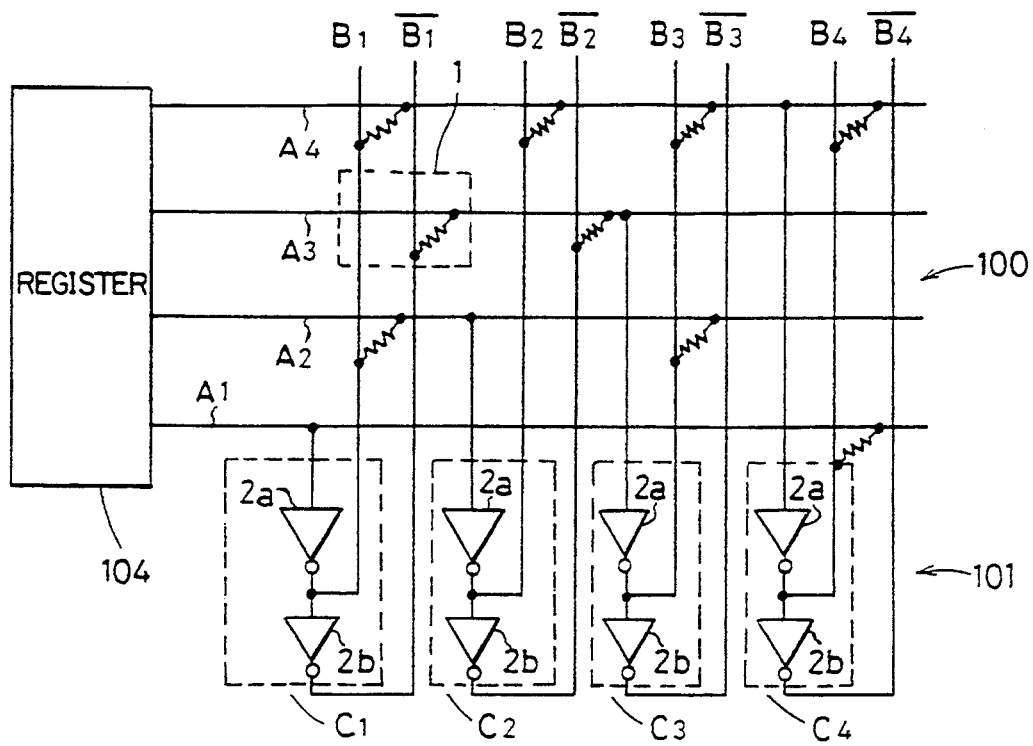
FIG. 4 is a diagram showing conceptual structure of the major part of a conventional semiconductor neural network chip.
Figure 5:
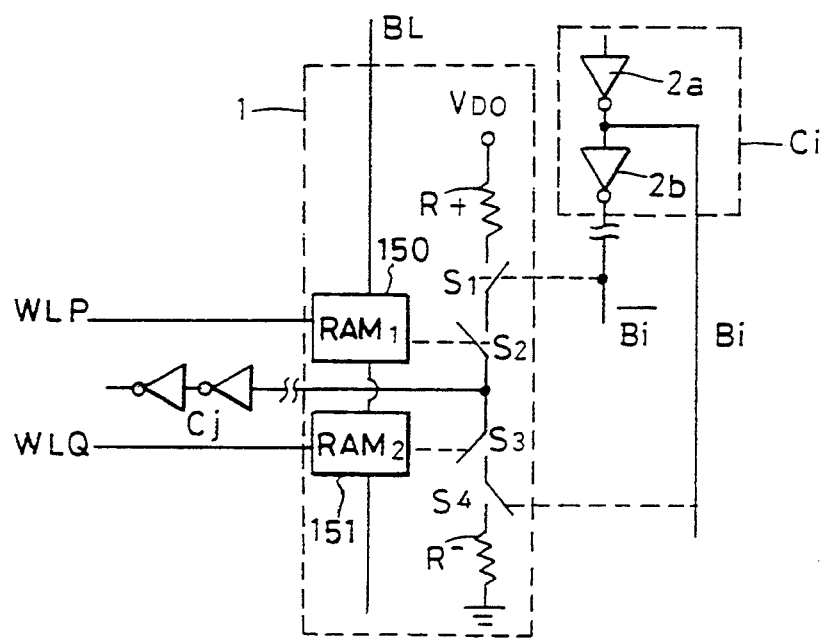
FIG. 5 is a diagram schematically showing structure of a basic synapse coupling element of the neural network shown in FIG. 4.
Figure 6:
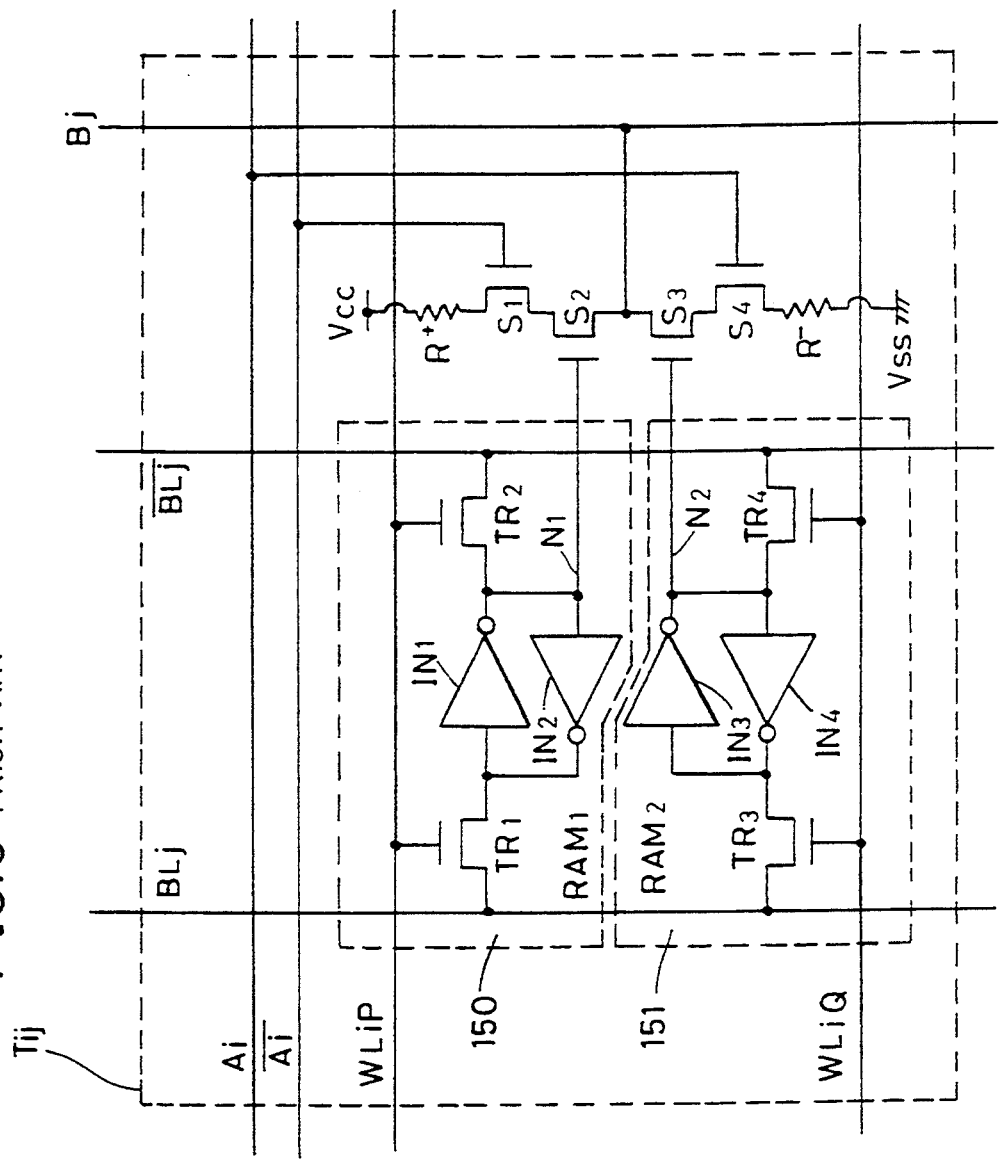
FIG. 6 is a diagram showing a specific structure of the basic synapse coupling element shown in FIG. 5.
Figure 7:
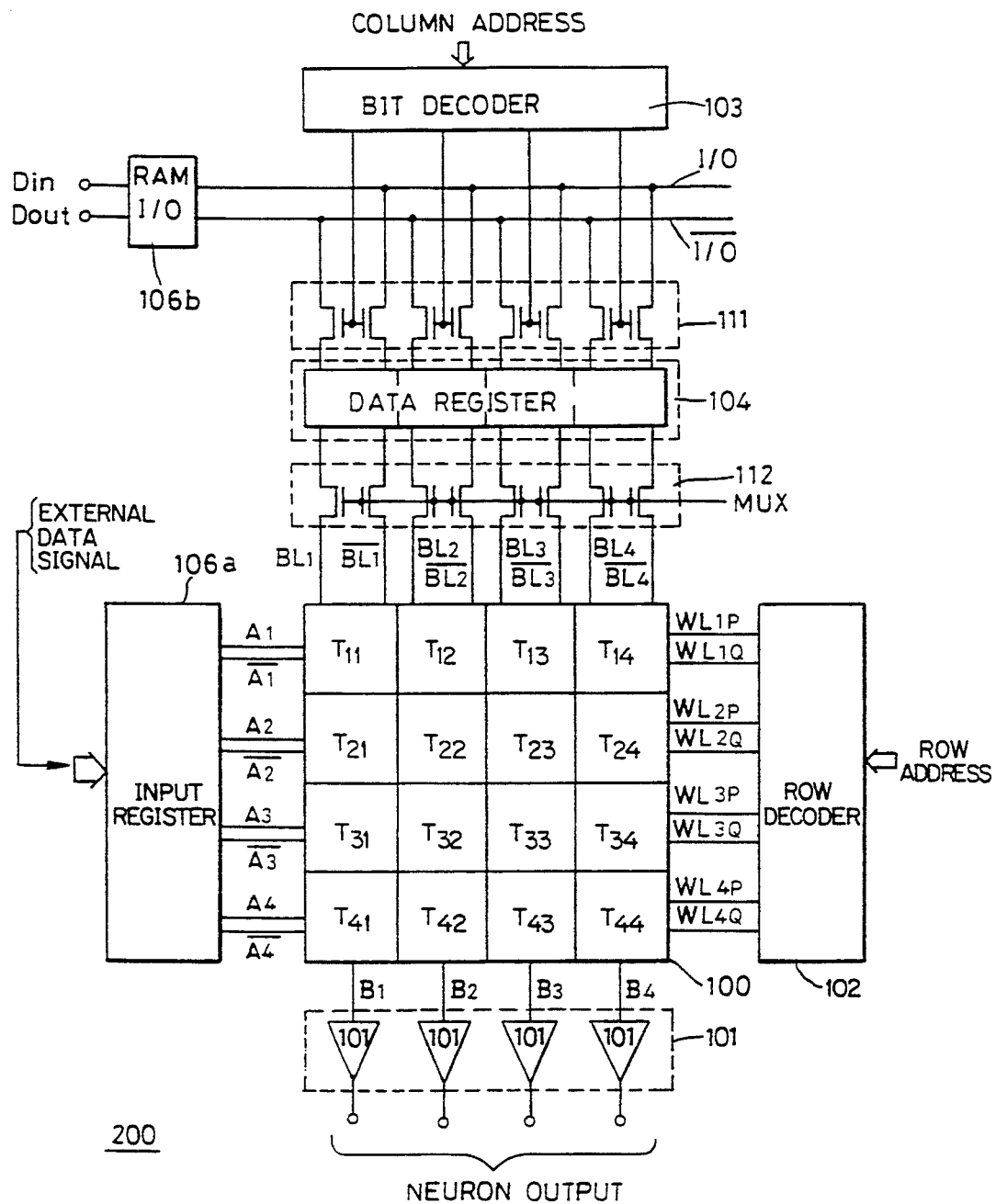
FIG. 7 is a diagram showing structure of a conventional semiconductor neural network chip using the basic synapse coupling elements as shown in FIG. 6.
Figure 8:
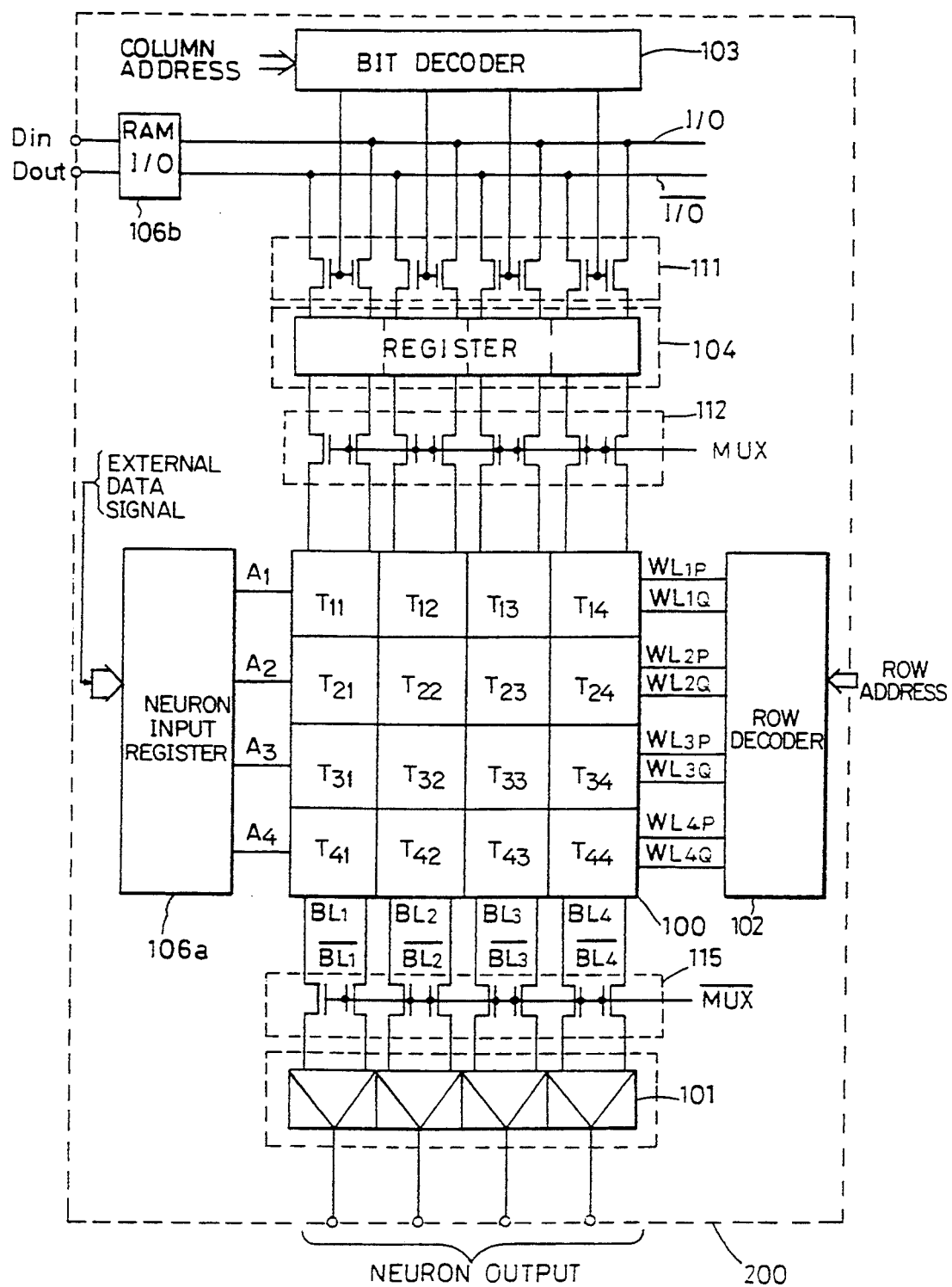
FIG. 8 is a diagram schematically showing the entire structure of a semiconductor neural network chip using the coupling elements as shown in FIG. 9.

FIG. 8 shows schematically the entire structure of a semiconductor neural network according to an embodiment of the present invention. The structure shown in FIG. 8 corresponds to that of the conventional semiconductor neural network shown in FIG. 7, and the same or equivalent parts are denoted by the same reference numerals.

In FIG. 8, the semiconductor neural network employs complementary bit line pairs of BL and $\overline{BL}$ also as internal data output line pairs. Output signal lines of an input register 106a are of a single line structure. Amplifying circuits 101 are provided corresponding to the bit line pairs and comprises amplifiers for differentially sensing and amplifying potentials on the corresponding bit line pairs.

Second transfer gates 115 are provided to connect the bit line pairs (internal data output line pairs) of BL1 and $\overline{BL1}$ to BL4 and $\overline{BL4}$ to the amplifying circuits 101 selectively according to operation modes. The second transfer gates 115 are rendered conductive in response to a connection control signal $\overline{MUX}$. In operation modes such as learning mode, or self-organizing mode where coupling strengths of the respective coupling elements in the coupling matrix 100 are programmed, the control signal $\overline{MUX}$ falls to "L" to disconnect the coupling matrix 100 from the amplifying circuits 101. On the other hand, in operation modes such as recalling mode where operational processings are performed on externally applied input data signals, the control signal $\overline{MUX}$ attains the "H" level to connect the coupling matrix 100 to the amplifying circuits 101. That is, the first and second transfer gates 112 and 115 perform complementary operations to each other.

Figure 9:
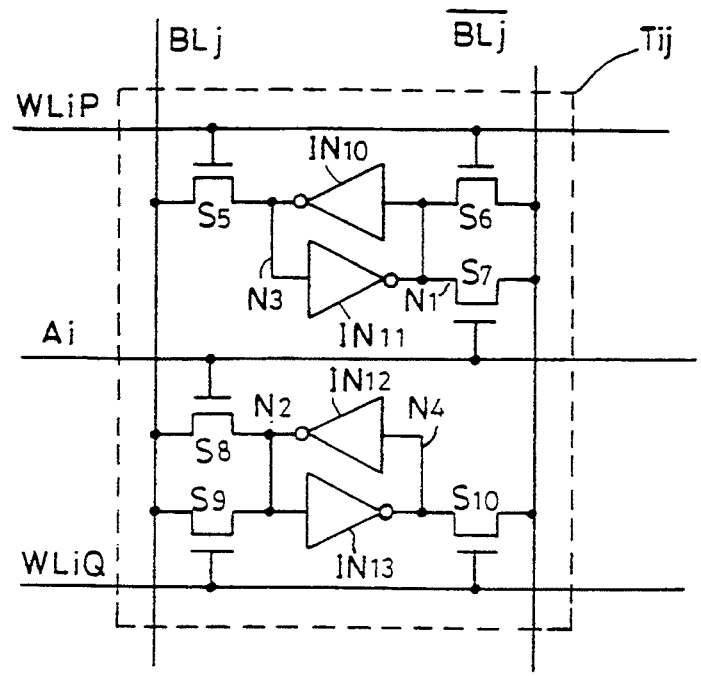
FIG. 9 is a diagram showing structure of a coupling element used in a semiconductor neural network according to an embodiment of the present invention.

FIG. 9 shows a specific structure of the coupling element Tij shown in FIG. 8. In FIG. 9, the coupling element Tij comprises inverting amplifiers IN10 and IN11 for storing information for a complementary bit line $\overline{BLj}$, and inverting amplifiers IN12 and IN13 for storing information for a bit line BL. The inverting amplifiers IN10 and IN11 are arranged anti-parallel with each other, or cross-coupled to each other to constitute a latch circuit. Likewise, the inverting amplifiers IN12 and IN13 are arranged anti-parallel with each other, or cross-coupled to each other to constitute another latch circuit.

The coupling element Tij further comprises a switching transistor S5 responsive to a signal potential on the word line WLiP for being turned on to connect a node N3 to the bit line BLj, a switching transistor S6 responsive to a signal potential on the word line WLiP for being turned on to connect another node N1 to the complementary bit line $\overline{BLj}$, and a switching transistor S7 responsive to a signal potential on the internal data input line Ai for being turned on to connect the node N1 to the complementary bit line $\overline{BLj}$. The coupling strength information stored in the latch circuit constituted of the inverting amplifiers IN10 and IN11 is transmitted to the complementary bit line $\overline{BLj}$ in response to the signal potential on the data input line Ai.

The coupling element Tij further comprises switching transistors S9 and S10 responsive to a signal potential on the word line WLiQ to connect nodes N2 and N4 to the bit line BLj and the complementary bit line $\overline{BLj}$, respectively, and a switching transistor S8 responsive to the signal potential on the internal data input line Ai to connect the node N2 to the bit line BLj. The coupling strength information stored in the storage circuit portion constituted of the inventing amplifiers IN12 and IN13 is transmitted onto the bit line BLj in response to the signal potential on the internal data input line Ai.

The coupling state of the coupling element Tij is determined according to the combination of signal potentials stored at the storage nodes N1 and N2. When signal potentials of the "L" and the "H" levels have been stored at the nodes N1 and N2, respectively, the coupling element Tij indicates the "excitatory state". When potentials of the same level have been stored at the storage nodes N1 and N2, no potential difference appears on the bit line pair of BLj and $\overline{BLj}$ so that the coupling element Tij indicates the "don't care (open) state". When signal potentials of the "H" and "L" levels have been stored at the nodes N1 and N2, respectively, the coupling element Tij has been programmed to indicate the "inhibitory state".

In the following, operation of the neural network shown in FIGS. 8 and 9 will be described with reference to the operation waveform chart of FIG. 10.

When the control signal MUX is set to the "H" level and the complementary control signal $\overline{MUX}$ is set to the "L" level, the semiconductor neural network is put in an operation mode where coupling strength data are written in or read out of the respective coupling elements contained in the coupling matrix 100. The control signal MUX determines a period for which storage contents in the storage elements are rewritten to change weighting of the synapse couplings in the self-organizing process, or learning.

When the control signal MUX attains "H", the first transfer gates 112 are rendered conductive so that the data register 104 is connected to the coupling matrix 100.

Subsequently, a row address and a column address are externally applied to the row detector 102 and the bit decoder 103, respectively, to select a corresponding word line (WLiP or WLiQ) and a corresponding bit line pair of BLj and $\overline{BLj}$. Meanwhile, the RAM I/O 106b converts externally applied information of coupling strength Din into a complementary data pair and transmits the converted data to the internal data buses I/O and $\overline{I/O}$. The complementary data pair transmitted to the internal data buses I/O and $\overline{I/O}$ is transmitted through a selective gate (one pair of transistors contained in the gates 111) selected by the bit decoder 103 to a corresponding data register to be latched therein.

The switching transistors S5 and S6 associated with the selected word line (for example, WLiP) are turned on, connecting the latch circuits constituted of the inverting amplifier circuits to the bit line pairs of BLj and $\overline{BLj}$. As a result, the data latched in the data register is transmitted through the switching transistors S5 and S6 to the storage nodes N1 and N3 to be latched therein. Meanwhile, the driving capability of the data register 104 is of course larger than the latching capability of the inverting amplifier circuit of IN10 and IN11 (IN12 and IN13). Therefore, it is possible to write signal potentials indicative of desired coupling strength information into the storage nodes N1 and N3.

When the word line WLiQ has been selected, information indicative of a desired coupling strength is written in the latch circuit constituted of the inverting amplifiers IN12 and IN13 so that signal potentials corresponding to the coupling strength information are stored in the nodes N2 and N4, respectively. By performing the above-described operation for the respective storage elements of the coupling elements T11 to T44 in the coupling matrix 100, information of coupling strengths can be programmed in the coupling matrix 100. This writing of the coupling strength information into the coupling matrix 100 is similar to the data writing operation in a general static random access memory.

Subsequently, when the control signal MUX falls to the "L" level and the complementary control signal $\overline{MUX}$ attains the "H" level, the first transfer gates 112 are put in the non-conductive state and the second transfer gates 115 are rendered conductive, putting the neural network in an operation mode specific to the neural network. An external data signal applied from outside of the neural network chip 200 is first held by the input register 106a and then the thus held external data signal is transmitted from the input register 106a to the internal data signal lines A1 to A4 as an internal data signal. In this operation mode, all the output potentials of the row decoder 102 are fixed at the "L" level so that all the switching transistors S5, S6, S9 and S10 (see FIG. 9) contained in the coupling elements are in the off-state.

Now, when the signal potential on the internal data input line Ai rises to the "H" level in response to the internal data signal, the switching transistors S7 and S8 of the coupling element Tij are turned on so that the signal potentials stored in the coupling element Tij are transmitted to the bit line pair (internal data output line pair) of BLj and $\overline{BLj}$. When the coupling element Tij has been programmed to be in the "excitatory state", the bit line BLj receives a signal potential of the "H" level and the complementary bit line $\overline{BLj}$ receives a signal potential of the "L" level. When the coupling element Tij has been programmed to be in the "inhibitory state", the bit lines BLj and $\overline{BLj}$ receive signal potentials of the "L" and "H" level, respectively. When the coupling element has been programmed to be in the "don't care (open) state", the bit lines BLj and $\overline{BLj}$ receive potentials of the same level.

When the signal potential on the internal data signal line Ai is at the "L" level, the switching transistors S7 and S8 are in the off state. Thus, the coupling element is in a state equivalent to the "don't care (open) state" since no potential change occurs on the bit line pair BLj and $\overline{BLj}$, irrespective of the storage information of the coupling element Tij. Such changes of signal potentials on the bit line pairs (internal data output line pairs), which occur according to the signal potentials on the internal data signal lines, proceeds at a time and in parallel in the respective coupling elements of the matrix 100. The signal potentials appearing on the bit line pairs of BL1 and $\overline{BL1}$ to BL4 and $\overline{BL4}$ as a result of the parallel operation are sensed and amplified by the amplifying circuits 101 and then converted into corresponding data signals to be output as neuron output data.

In the structure of coupling element shown in FIG. 9, a word line, a bit line and an internal data input line are each connected to the same number of transistors and have the same stray capacitance associated therewith. However, the number of transistors connected to the input portion of one inverting amplifier circuit is different from the number of transistors connected to the output portion of the same circuit. This leads to an imbalanced stray capacitance in one storage element portion and also to imbalanced latching capability of the latch circuit. As a result, the writing or reading operation of the coupling strength information becomes unstable, and in some cases, the coupling strength information may not be precisely stored and read out.

Figure 11:
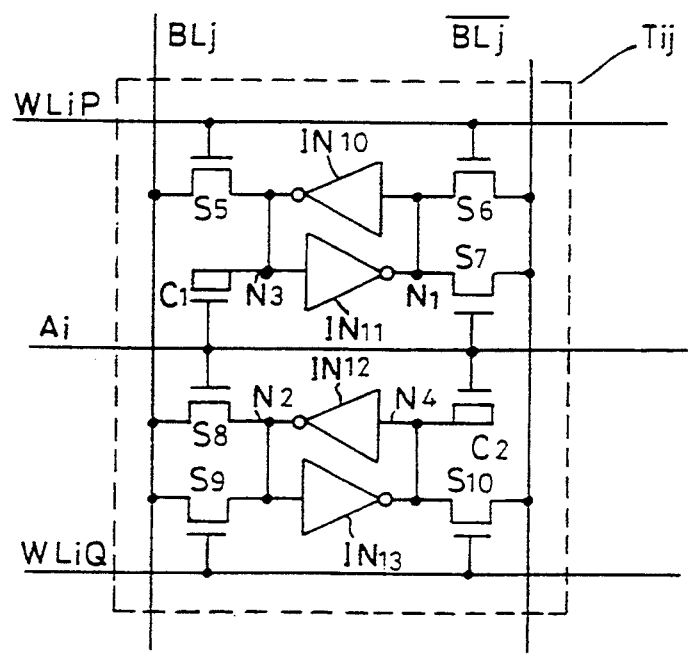
FIG. 11 is a diagram showing structure of a coupling element according to another embodiment of the present invention.

In FIG. 11, there is shown a structure of coupling element which can avoid such an unbalanced stray capacitance in the storage element portion and stabilize the operations of reading and writing the coupling strength information in the storage element portion. In the structure of coupling element shown in FIG. 11, dummy capacitors C1 and C2 are connected between the nodes N3 and N4 and the internal data input line Ai, respectively. The dummy capacitors C1 and C2 are formed by connecting conductive terminals of MIS transistors and equalize stray capacitances in the inverting amplifier circuits of IN10 and IN11, and of IN12 and IN13. In this case, the switching transistors S5, S6, S7, S8, S9 and S10 and the dummy capacitors C1 and C2 are constituted of MIS transistors of the same size. With this structure, the stray capacitances in the storage element portions can be easily balanced, making the reading and writing operations of the coupling strength information stable.

Figure 12:
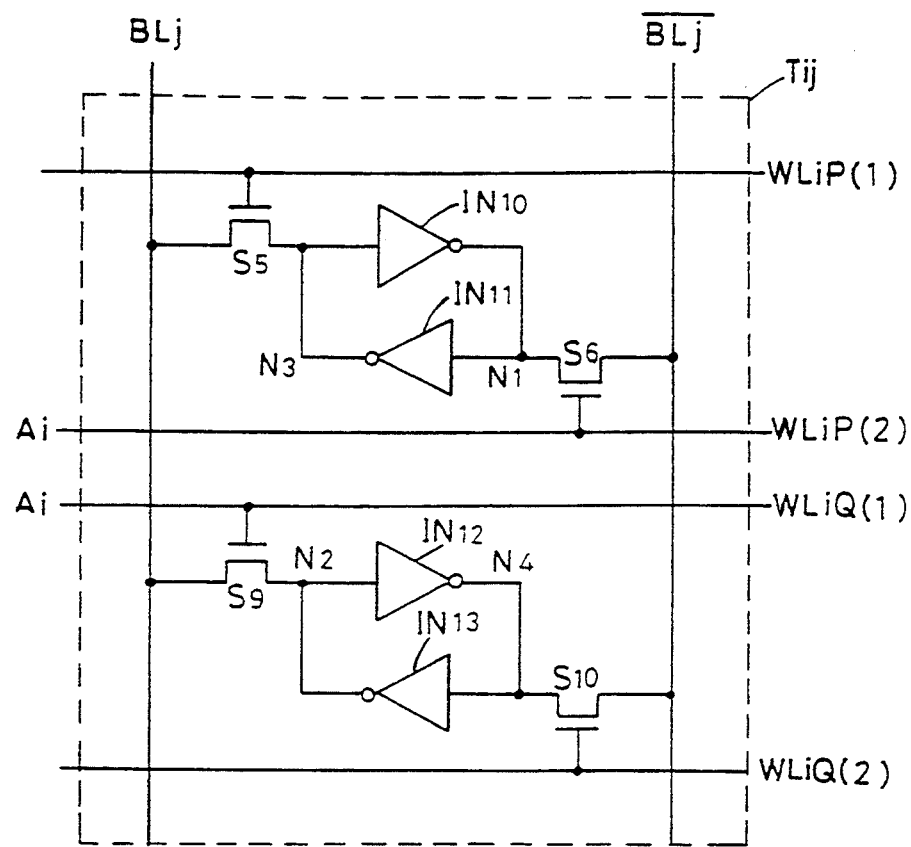
FIG. 12 is a diagram showing structure of a coupling element according to still another embodiment of the present invention.

FIG. 12 shows a second modified structure of the coupling element shown in FIG. 9. The coupling element comprises a switching transistor S5 responsive to a signal potential on a first word line WLiP(1) for being turned on to connect the node N3 to the bit line BLj, a switching transistor S6 responsive to a signal potential on a second word line WLiP(2) for being turned on to connect the node N2 to the complementary bit line $\overline{BLj}$, and inverting amplifiers IN10 and IN11 cross-coupled to each other between the nodes N1 and N3. The coupling element further comprises a switching transistor S9 responsive to a signal potential on a third word line WLiQ(1) for being turned on to connect the node N2 to the bit line BLj, a switching transistor S10 responsive to a signal potential on a fourth word line WLiQ(2) to connect the node N4 to the complementary bit line $\overline{BLj}$, and inverting amplifier IN12 and IN13 cross-coupled to each other between the nodes N12 and N4.

The first and second word lines WLiP(1) and WLiP(2) receive the same row select signal. The third and fourth word lines WLiQ(1) and WLiQ(2) receive the same row select signal.

Further, the word lines WLiP(2) and WLiQ(1) are used also as an internal data input line Ai to receive the same internal data signal.

In the basic element structure shown in FIG. 12, the stray capacitances in the storage element portions can be balanced without providing the dummy capacitors to balance them. Furthermore, since the number of transistors constituting a basic coupling element is less, the area occupied by the coupling element can be reduced.

Additionally, in the basic coupling element structures shown in FIGS. 9, 11 and 12, the double-end structure is employed so that the coupling strength information is written in through both bit line BLj and its complementary bit line $\overline{BLj}$. Instead of such structure, a single-end structure may be employed which is obtained, for example, by eliminating the switching transistors S6 and S9 from the coupling element structure shown in FIG. 9 so that information of a desired coupling strength be written in through only one of the paired bit lines.

Figure 13:
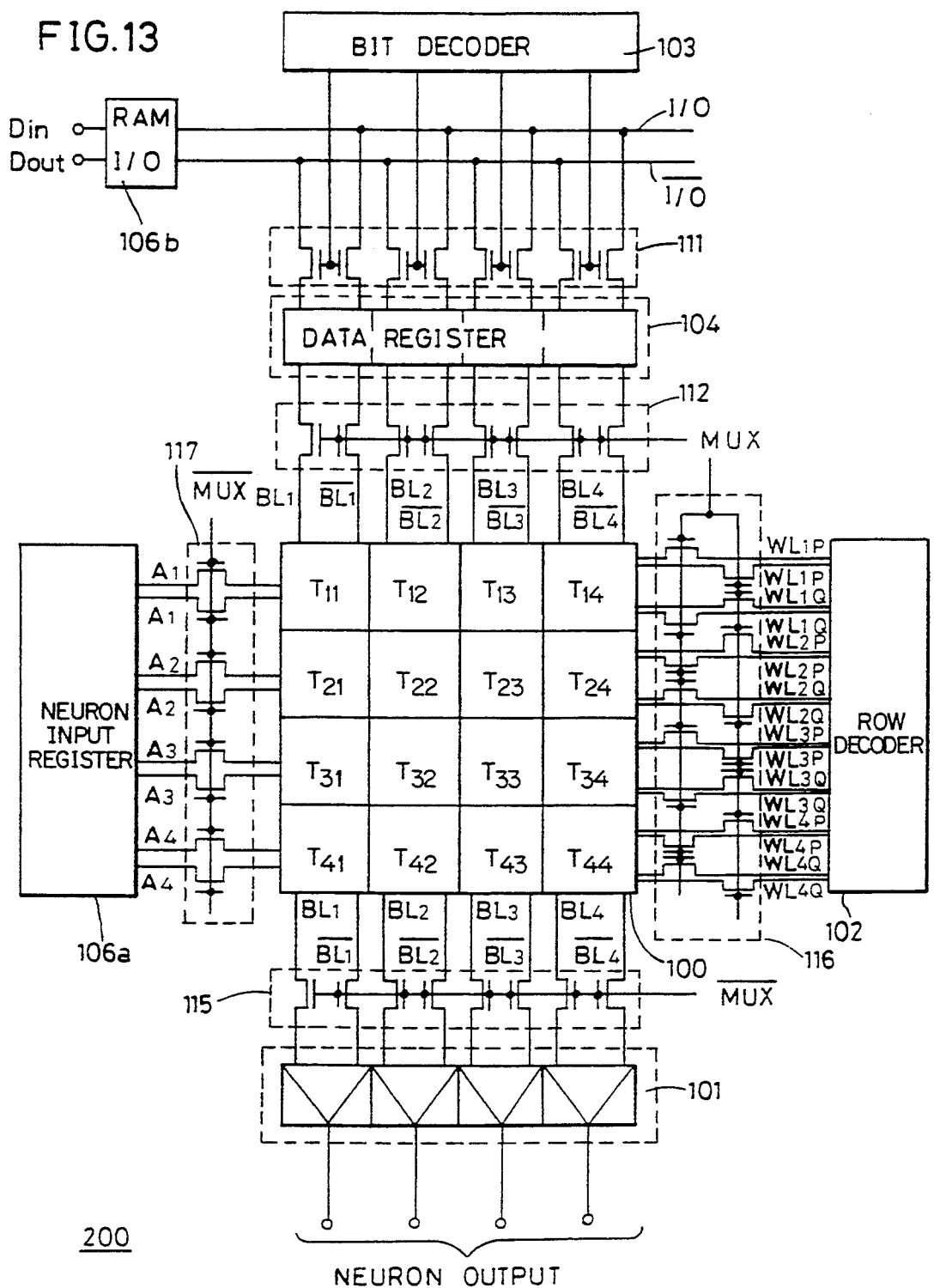
FIG. 13 is a diagram showing the entire structure of a semiconductor neural network using the coupling elements as shown in FIG. 12.

FIG. 13 shows the entire structure of a semiconductor neuron network with coupling matrix 100 having coupling elements as shown in FIG. 12 arranged in 4 rows and 4 columns. In the structure shown in FIG. 13, the word lines and the internal data input lines share the same signal lines. Therefore, in addition to the structure shown in FIG. 8, there are provided connection gates 116 responsive to control signal MUX for being turned on to connect row decoder 102 to the coupling matrix 100 and connection gates 117 responsive to complementary control signal $\overline{MUX}$ to connect neuron input register 106a to the coupling matrix 100. Further, since the internal data input lines are required to correspond to the respective two storage element circuit portions of the coupling elements, two signal lines transmitting the same internal data input signal are provided as internal data input lines for a single coupling element. Furthermore, a single coupling element requires four word lines, the output signal lines of the row decoder 102, or word lines are doubled in number when compared with the structure shown in FIG. 8. For the output signal lines, or the word lines of the row decoder 102 shown in FIG. 13, word lines denoted by the same reference numeral receive the same row select signal.

In such a structure as shown in FIG. 13 where either the neuron input register 106a or the row decoder 102 is connected to the coupling matrix 100 according to operation modes, the word lines and the internal data input lines can share the same signal lines, as previously described. Thus, in practice, a doubled number of signal lines are not required, but the number of signal lines increases by only one for one row, so that a coupling matrix occupying a small area can be realized.

Figure 14:
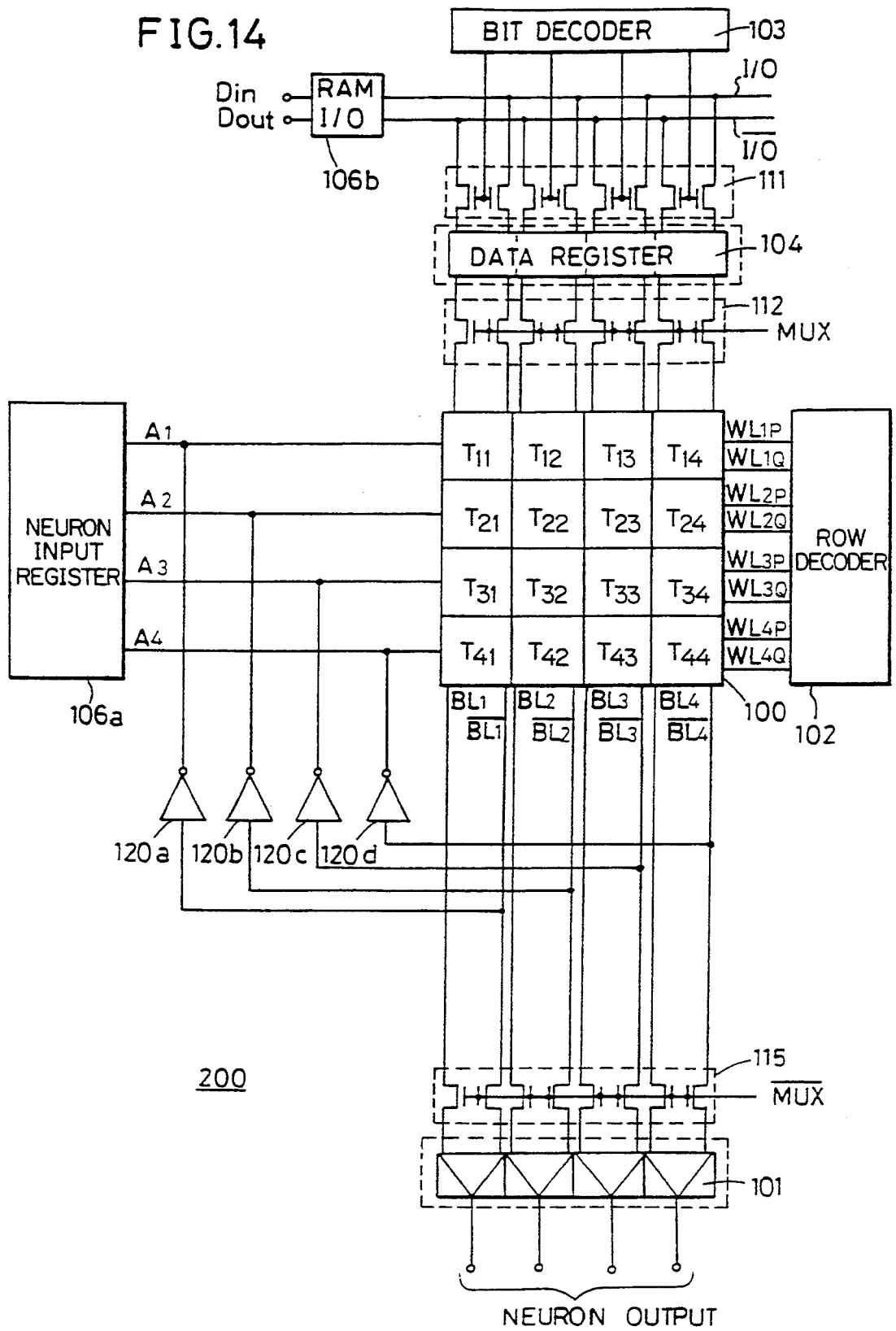
FIG. 14 is a diagram schematically showing the entire structure of a semiconductor neural network chip which has a feedback circuit using the coupling elements as shown in FIG. 9.

Meanwhile, the semiconductor neural networks shown in FIGS. 8 and 13 have non-Hopfield's type structures where oaths for feeding back the internal output data signals into the coupling matrix are not provided. However, these structures can be easily modified to constitute Hopfield's type neural networks only with the provision of the feedback paths. FIG. 14 shows an example of structure of a Hopfield's type semiconductor neural network using coupling elements according to the present invention.

In FIG. 14, the Hopfield's type semiconductor neural network according to the present invention comprises inverting amplifiers 120a, 120b, 120c and 120d for inverting outputs of complementary bit lines $\overline{BL1}$, $\overline{Bl2}$, $\overline{BL3}$ and $\overline{BL4}$ and transmitting the inverted outputs to internal data input lines A1, A2, A3 and A4. The inverting amplifiers 120a and 120d allow the internal data output signals from the coupling matrix 100 to be fed back through the internal data input signal lines. Thus, a neural network according to the Hopfield's model is configured.

Figure 15:
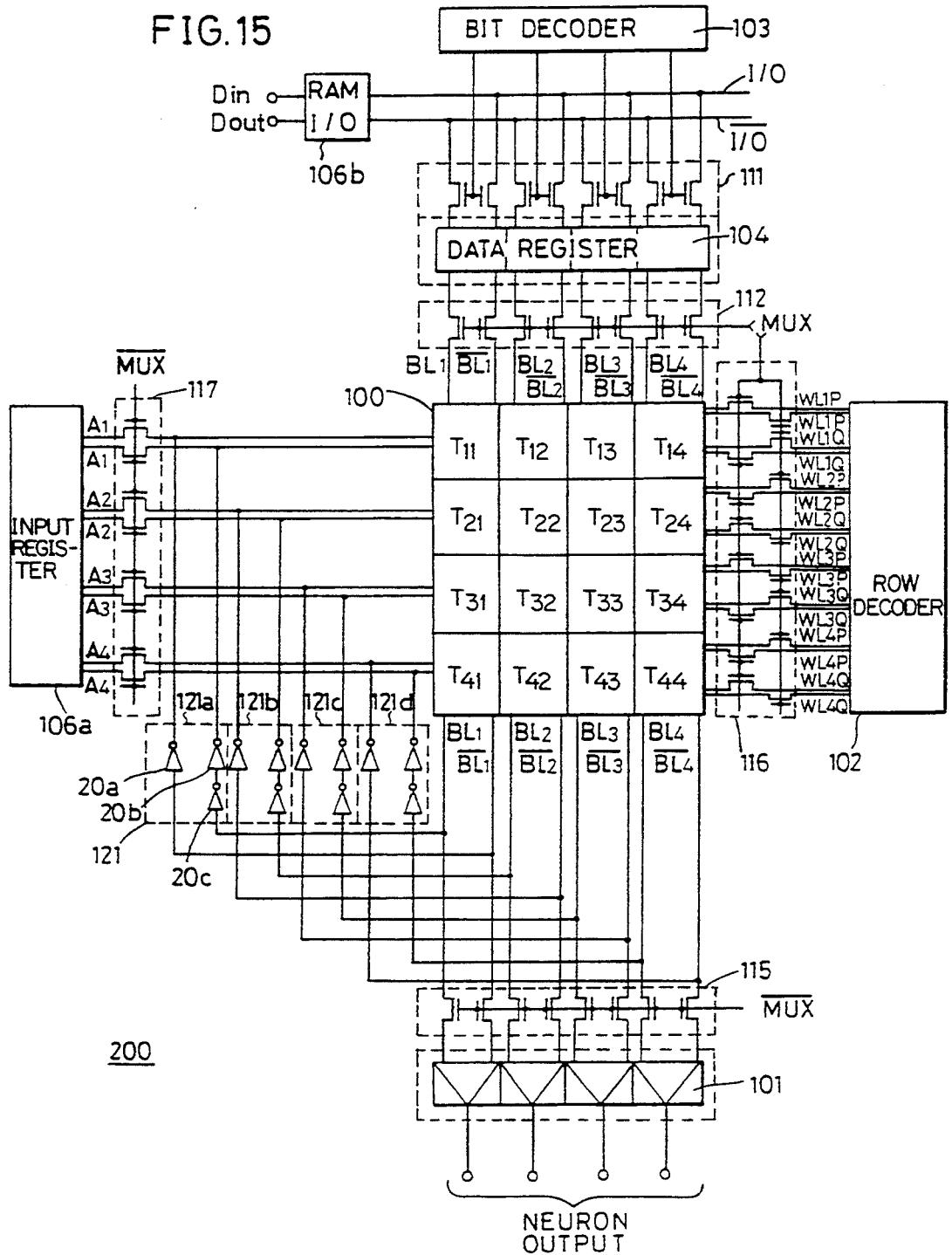
FIG. 15 is a diagram schematically showing structure of a Hopfield's type semiconductor neural network using the coupling elements as shown in FIG. 12.

FIG. 15 shows an example of structure of a Hopfield's type semiconductor neural network obtained by modifying the non-Hopfield's type semiconductor neural network shown in FIG. 13. In the semiconductor neural network shown in FIG. 15, feedback amplifying circuits 121 are provided to transmit signal potentials on the respective bit line pairs of BL1 and $\overline{BL1}$ to BL4 and $\overline{BL4}$ to the internal data input line pairs A1 to A4. Each of the feedback amplifying circuits 121 comprises an inverting amplifier 20a for inverting potential on a complementary bit line $\overline{BLi}$ and transmitting the inverted potential onto a corresponding internal data input line Ai, and inverting amplifiers 20b and 20c connected in series over two stages for transmitting potential on a positive bit line BLi onto another corresponding input data signal line Ai. In the structure shown in FIG. 15, the feedback paths are provided in the same manner though both the internal data input lines and the internal data output lines form pairs, so that a Hopfield's type neural network is configured.

Figure 16:
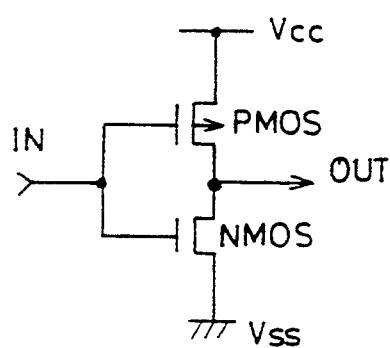
FIG. 16 is a diagram showing an example of structure of an inverting amplifier circuit constituting the storage element contained in a coupling element.

FIG. 16 shows an example of structure of an inverting amplifier comprised in the storage element portion of a coupling element. In FIG. 16, an inverting amplifier circuit is formed of a complementary (CMOS) logic circuit comprising a p-channel MIS transistor PMOS and an n-channel MIS transistor NMOS. The structure shown in FIG. 16 is characterized by its large output driving capability and large noise margin. These characteristics allow the circuit to transmit precise coupling strength information onto a corresponding bit line in a reliable manner.

Figure 17:
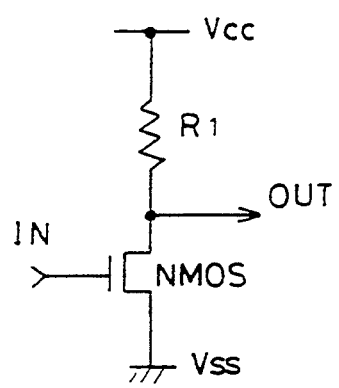
FIG. 17 is a diagram showing another structure of inverting amplifier circuit constituting the storage element contained in a coupling element.

FIG. 17 shows another structure of an inverting amplifier comprised in the storage element portion of a coupling element. In the structure shown in FIG. 17, an inverting amplifier circuit is constituted of a load resistor R1 formed of, for example, polysilicon and an n-channel MIS transistor NMOS. The resistor R1 transmits a predetermined supply potential Vcc to the output portion. The n-channel MIS transistor NMOS receives an input signal IN at its gate and drives the output portion according to its gate potential. Since in the structure of inverting amplifier shown in FIG. 17, the load resistor is employed, the circuit size can be made smaller than that of the inverting amplifier shown in FIG. 16.

While in all the embodiments described above, it has been simply stated that in the operational processings of the neural network, the data register 104 is disconnected from the coupling matrix 104 and instead, the amplifying circuits 101 are connected to the coupling matrix 100, no reference has been made to initialization of the bit line potentials. In initializing the bit lines that are to be held in the floating state, it takes a long time in the operational processings to establish potentials on the bit lines that have been held at the levels transmitted in programming the coupling strengths of the respective coupling elements in the coupling matrix 100. On the other hand, if all the bit lines are set either to the "L" or "H" level in the initialization, it takes a long time to establish the "H" or "L" level on the bit lines. This leads to longer charging and discharging time, resulting in an increased power consumption. To overcome such disadvantages, a circuit structure which can drive the bit lines reliably at a high speed and with low power consumption is shown in FIG. 18.

Figure 18:
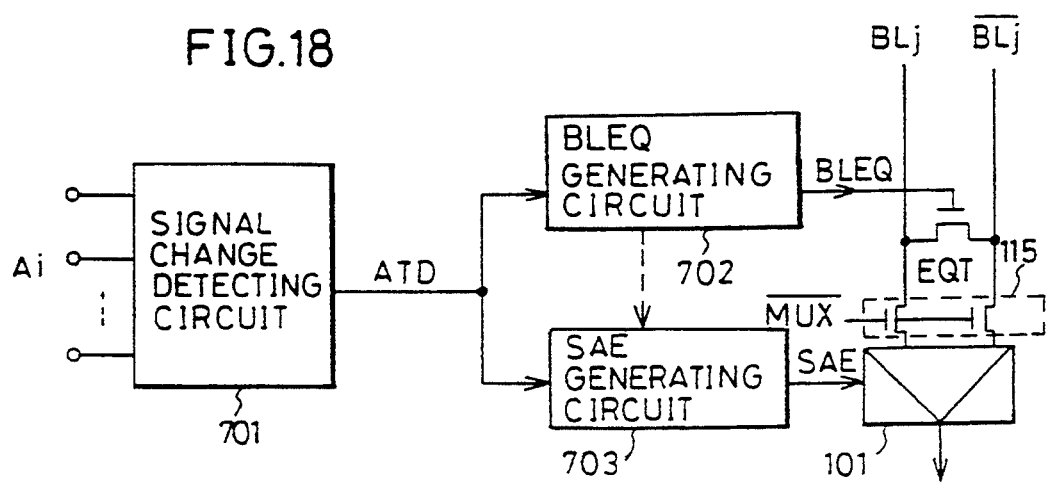
FIG. 18 is a diagram showing a circuit structure for generating internal operation control signals in a semiconductor neural network, according to an embodiment of the present invention.

Referring to FIG. 18, the bit line driving circuit comprises a signal change detecting circuit 701 for detecting a time of change of an external or internal input data signal Ai and generating a one-shot pulse signal (input change detecting signal) ATD having a predetermined time interval, a BLEQ generating circuit 702 responsive to the input change detecting signal ATD for generating an equalize signal BLEQ having a predetermined time interval, and an SAE generating circuit 703 responsive to the input change detecting signal ATD and the equalize signal BLEQ for generating a sense amplifier activating signal SAE. The equalize signal BLEQ from the BLEQ generating circuit 702 is transmitted to equalize transistors EQT provided to short-circuit paired bit lines.

The signal change detecting circuit 701 has the same structure as that of a circuit for generating an address change detecting signal which generates internal operation signals, for example, in a random access memory. The generation of the input change detecting signal ATD allows a starting point of an computing operation cycle to be reliably detected. Since it is desirable that operation timings of the circuit can be detected as early as possible, an externally applied input data signal may be preferably supplied as the input data signal Ai to the signal change detecting circuit 701. In the following, operation of the circuit shown in FIG. 18 will be described with reference to the operation waveform chart of FIG. 19.

When the neural network enters the operational processing mode, or recalling operation mode, the control signal MUX falls to "L" and the complementary control signal $\overline{MUX}$ attains the "H" level. As a result, the transfer gates 115 are rendered conductive, connecting the bit lines BLj and $\overline{BLj}$ to the amplifying circuits 101. Subsequently, the input signal Ai is applied and then a point of change of the input signal Ai is detected by the signal change detecting circuit 701 to generate the input change detecting signal ATD. This input change detecting signal ATD has a predetermined time interval. In response to the input change detecting signal ATD, the BLEQ generating circuit 702 is activated to generate the equalize signal BLEQ. In response to this equalize signal BLEQ, the equalize transistors EQT are rendered conductive so that potentials on the paired bit lines BLj and $\overline{BLj}$ are equalized. Meanwhile, the signal waveform chart shown in FIG. 19 shows a case where the bit line pairs of BLj and $\overline{BLj}$ are equalized at an intermediate potential between the "H" and "L" levels. This can be realized by providing the respective bit lines with transistors which are rendered conductive, in response to the equalize signal BLEQ, to precharge the bit lines to the intermediate potential. The equalize signal BLEQ is a one-shot pulse signal having a predetermined time interval. Therefore, when the generation of the pulse signal terminates, subtle potential differences appear over the bit lines BLj and $\overline{\text{BLj}}$ due to functions of the coupling elements.

Subsequently, when the generation of the input change detecting signal ATD and the equalize signal BLEQ terminates, the SAE generating circuit 703 is activated to generate the sense amplifier activating signal SAE. Then, the amplifying circuits 101 are activated to differentially sense and amplify the subtle differences of signal potentials on the corresponding bit line pairs of BLj and $\overline{\text{BLj}}$ and output the results as neuron output signals. Meanwhile, in the operation waveform chart shown in FIG. 19, a case is shown where the signal potentials of the bit line pairs of BLj and $\overline{\text{BLj}}$ make full-swing between the "H" and "L" levels due to functions of the sense amplifier circuits 101. However, the differences of signal potentials can be sensed and amplified for output without the potentials on the bit lines being affected by such full-swing if only current-mirror type differential amplifier circuits are employed, for example.

As described above, by equalizing potentials on the bit line pairs immediately after the neuron input data signal has changed, potentials changes which might be caused under the influences of noise and the like on the bit line pairs can be prevented. Accordingly, it becomes possible to shorten the time taken until effective information appears on the bit lines, so that a neural network operable at a high speed and with low power consumption can be obtained.

If the equalize transistors EQT for equalizing the bit line pairs have been adapted to be able to function also in programming coupling strengths of the coupling elements in the coupling matrix 100, the programming of coupling states of the coupling matrix can be performed also at a high speed. Additionally, a circuit structure for precharging the bit line pairs to the predetermined potential may be separately provided.

Further, if the equalize/precharge transistors are provided as described above, subtle differences of the potentials can be differentially sensed and amplified in a reliable manner. Accordingly, activation timings of the amplifying circuits can be made earlier, so that a neural network operable at a high speed can be obtained.

When a large scale parallel operation is performed in the coupling matrix corresponding to the internal input data signal applied for a long time, potentials on the respective bit line pairs may have full-swing. In this case, since those coupling elements whose internal input data signals are at the "H" level have the storage nodes of their storage elements connected to the bit lines, the contents stored in the storage elements may be rewritten by the potentials on the bit lines due to the full-swing, and further, the storage contents of the storage elements may be even destructed. A circuit structure for stabilizing the storage information in the coupling elements in shown in FIG. 20.

Figure 20:
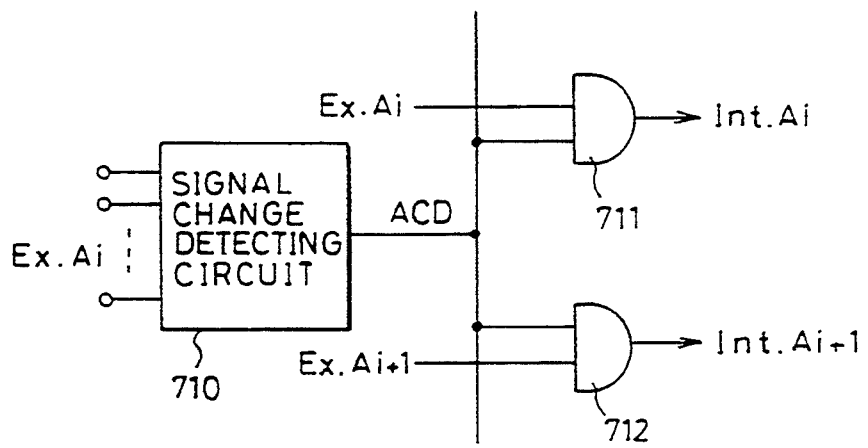
FIG. 20 is a diagram showing a circuit structure for generating other internal signals in a semiconductor neural network, according to the present invention.

Referring to FIG. 20, the circuit structure for stabilizing the storage information in the coupling elements comprises signal change detecting circuit 710 for detecting a time of change of an externally applied input data signal Ex. Ai and generating, in response to the detected change, input change detecting signal ATD of one-shot pulse having a predetermined time interval, and gate circuits 711 and 712 which receive the input change detecting signal ACD and the externally applied input data signal Ex. Ai for generating one-shot internal input data signals Int. Ai. The gate circuits 711, 712 and the like are provided corresponding to the respective bits of the external input data signal. An operation waveform chart of the circuit structure shown in FIG. 20 is shown in FIG. 21. When the internal input data signal Ai is formed as a one-shot pulse signal using such a circuit structure as shown in FIG. 20, the time taken to perform operational processings on the internal input data signal becomes short, no longer allowing the full-swing of signal potentials on the bit line pairs of BLj and $\overline{\text{BLj}}$ even if a large scale parallel operation is performed in the coupling matrix. That is, since the operation time is short, only small potential changes occur which appear usually before full-swing. Thus, the destruction of the storage information in the coupling elements can be prevented. Further, when the input data signal is converted into a one-shot pulse signal according to the input change detecting signal ACD, the switching transistors in the coupling elements are turned off at earlier timings. This means that the coupling elements are disconnected from the bit line pairs at earlier timings, preventing the destruction of the storage contents in the coupling elements.

In the signal waveform chart shown in FIG. 21, the signal potentials on the bit lines BLj and $\overline{\text{BLj}}$ are equalized every time the input change detecting signal is generated, because the equalize signal as shown in FIG. 18 is generated. When such a one-shot internal input data signal as shown in FIG. 21 is employed, the amplifying circuits can differentially sense and amplify signal potentials on the bit line pairs in a reliable manner, no matter how small the potential changes on the bit lines BLj and $\overline{\text{BLj}}$ may be. Accordingly, operation performance of the neural network can not be reduced.

When the circuit structure shown in FIG. 20 is employed, the input change detecting signal ACD shown in FIG. 20 is applied also to BLEQ generating circuit 702 generating bit line equalize signal BLEQ and to SAE generating circuit 703 generating activation signal SAE to activate amplifying circuits.

In the embodiments above, a circuit structure for programming coupling strengths in the coupling matrix has been described as allowing writing of the coupling strength information for one column after another, or bit by bit, with the use of bit line decoder 103. Instead of such structure, however, shift registers may be provided over a number of stages corresponding to the number of coupling elements in one row. In this case, coupling strength information of one row is written in the shift registers and then the coupling strength information is transferred from the shift registers to one row of coupling elements at a time.

As has been described above, according the present invention, each of the coupling elements contained in the coupling matrix of a neural network is constituted of storage element portions comprising cross-coupled inverting amplifiers, and elements responsive to potentials on word lines for writing signal potentials on bit lines into the storage elements and also responsive to potentials on internal input data signal lines for transmitting the storage information in the storage element portions onto the bit line. Further, the signal lines for transmitting coupling strength information in the learning mode where the coupling strength information is to be written and the data lines for outputting the internal data output signals in the neural network operating mode, or recalling mode share the same lines. Accordingly, the number of interconnections in the coupling matrix and also the number of elements constituting a coupling element can be reduced, so that coupling elements which have a simple structure and occupy a small area can be provided. Thus, a highly integrated and high-density semiconductor neural network can be obtained.

Furthermore, since the internal input data signal is formed as a one-shot pulse signal to be transmitted into the coupling matrix, the bit line potentials do not make full-swing and the coupling elements are disconnected from the bit lines, or internal data lines at earlier timings. Accordingly, the neural network can be driven at a high speed and with low consumption power and stable operation can be assured without causing destruction of the storage information in the coupling element.

Furthermore, since potentials on the bit lines are equalized in response to the input data signal change detecting signal, it becomes possible to sense and amplify the potentials on the bit lines at a high speed without being influenced by noise and the like. Consequently, a semiconductor neural network operable at a high speed and with low consumption power can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor neural network device, comprising:

a plurality of internal data input lines each for receiving an input data signal to be processed;

a plurality of internal data output lines arranged in a direction intersecting said internal data input lines, each for transmitting data for output;

a plurality of coupling elements provided at the connections of said internal data input lines and said internal data output lines, for coupling with specific coupling strengths which can be programmed in advance the internal data input lines to the corresponding internal data output lines and transmitting data signal potentials between said internal data input lines and said corresponding internal data output lines;

a plurality of row select lines each connected to one row of said plurality of coupling elements;

coupling strength information transmitting means for transmitting coupling strength information of said plurality of coupling elements to said respective internal data output lines in a program mode where coupling strengths are written in the coupling elements; and a plurality of sense amplifier means each provided corresponding to one of said internal data output lines for sensing and amplifying a signal potential on the corresponding internal data output line and producing output data in an operation mode where operation is performed on said input data to be processed, each of said plurality of coupling elements comprising:

storage means for storing information indicative of a specific coupling strength;

first means operative in a first mode for writing a signal potential on an associated internal data output line to said storage means, and operative in a second mode for supplying a signal stored in said storage means onto said associated internal data output line.

2. The device according to claim 1, wherein said first means includes means responsive to a signal potential on an associated row select signal line for being turned on to write a signal potential on an associated internal data output line to said storage means; and storage information transmitting means responsive to a signal potential on an associated internal data input line for being turned on to transmit the information stored in said storage means onto said associated internal data output line.

3. The device according to claim 1, wherein each of said internal data output lines includes a pair of first and second signal lines for receiving pieces of coupling strength information complementary to each other, and each of said coupling elements includes a first coupling element having storage information transmitting means responsive to a signal potential on an associated internal data input line for transmitting storage information to said first signal line, and a second coupling element having storage information transmitting means responsive to the signal potential on said associated internal data input line for transmitting storage information to said second signal line, the storage information in said first and second coupling elements expressing together one coupling strength.

4. A semiconductor neural network device, comprising:

a plurality of internal data input lines each for receiving an input data signal to be processed;

a plurality of internal data output lines arranged in a direction intersecting said internal data input lines, each for transmitting data for output;

a plurality of coupling elements provided at the connections of said internal data input lines and said internal data output lines, for coupling with specific coupling strengths which can be programmed in advance the internal data input lines to the corresponding internal data output lines and transmitting data signal potentials between said internal data input lines and said corresponding internal data output lines;

a plurality of row select lines each connected to one row of said plurality of coupling elements;

coupling strength information transmitting means for transmitting coupling strength information of said plurality of coupling elements to said respective internal data output lines in a program mode where coupling strengths are written in the coupling elements; and a plurality of sense amplifier means each provided corresponding to one of said internal data output lines for sensing and amplifying a signal potential on the corresponding internal data output line and producing output data in an operation mode where operation is performed on said input data to be processed, each of said plurality of coupling elements comprising:

storage means for storing information indicative of a specific coupling strength, and first means operative in a first mode for writing a signal potential on an associated internal data output line to said storage means, and operative in a second mode for supplying a signal stored in said storage means onto said associated internal data output line, wherein each of said internal data output lines includes a pair of first and second signal lines for receiving pieces of coupling strength information complementary to each other, each of said coupling elements includes a first coupling element having storage information transmitting means responsive to a signal potential on an associated internal data input line for transmitting storage information to said first signal line, and a second coupling element having storage information transmitting means responsive to the signal potential on said associated internal data input line for transmitting storage information to said second signal line, the storage information in said first and second coupling elements expressing together one coupling strength;

each of said row select lines includes a first row select line for selecting said first coupling element and a second row select line for selecting said second coupling element, each of said storage means in said first and second coupling elements has first and second nodes, said first coupling element comprises;

first and second switching elements as said writing means, responsive to a signal potential on said first row select line for connecting said first and second nodes to said second and first signal lines, respectively, and a third switching element as said storage information transmitting means, responsive to the signal potential on said associated internal data input line for connecting said second node to said first signal line, and said second coupling element comprises;

fourth and fifth switching elements as said writing means, responsive to a signal potential on said second row select line for connecting said first and second nodes to said second and first signal lines, respectively, and a sixth switching element as said storage information transmitting means, responsive to the signal potential on said associated internal data input line for connecting said first node to said first signal line.

5. The device according to claim 4, wherein said first to sixth switching elements have specific capacitances, said first coupling element includes first capacitor element means provided between said first node and said associated internal data input line and having the same capacitance value as that of said third switching element, and said second coupling element includes second capacitor element means provided between said second node and said associated internal data input line and having the same capacitance value as that of said sixth switching element.

6. The device according to claim 5, wherein each of said first to sixth switching elements is constituted of a first insulated gate field effect transistor, said first capacitor element means is constituted of a second insulated gate field effect transistor having its gate connected to said internal data input line and both of its conductive terminals connected to said first node and having the same size as that of said first insulated gate field effect transistor, and said second capacitor element means is constituted of a third insulated gate field effect transistor having its gate connected to said associated internal data input line and both of its conductive terminals connected to said second node and having the same size as that of said first insulated gate field effect transistor.

7. A semiconductor neural network device, comprising:

a plurality of internal data input lines each for receiving an input data signal to be processed;

a plurality of internal data output lines arranged in a direction intersecting said internal data input lines, each for transmitting data for output;

a plurality of coupling elements provided at the connections of said internal data input lines and said internal data output lines, for coupling with specific coupling strengths which can be programmed in advance the internal data input lines to the corresponding internal data output lines and transmitting data signal potentials between said internal data input lines and said corresponding internal data output lines;

a plurality of row select lines each connected to one row of said plurality of coupling elements;

coupling strength information transmitting means for transmitting coupling strength information of said plurality of coupling elements to said respective internal data output lines in a program mode where coupling strengths are written in the coupling elements; and a plurality of sense amplifier means each provided corresponding to one of said internal data output lines for sensing and amplifying a signal potential on the corresponding internal data output line and producing output data in an operation mode where operation is performed on said input data to be processed, each of said plurality of coupling elements comprising:

storage means for storing information indicative of a specific coupling strength, and first means operative in a first mode for writing a signal potential on an associated internal data output line to said storage means, and operative in a second mode for supplying a signal stored in said storage means onto said associated internal data output line, wherein each of said internal data output lines includes a pair of first and second signal lines for receiving pieces of coupling strength information complementary to each other, each of said coupling elements includes a first coupling element having storage information transmitting means responsive to a signal potential on an associated internal data input line for transmitting storage information to said first signal line, and a second coupling element having storage information transmitting means responsive to the signal potential on said associated internal data input line for transmitting storage information to said second signal line, the storage information in said first and second coupling elements expressing together one coupling strength;

each of said row select lines includes a first row select line for selecting said first coupling element and a second row select line for selecting said second coupling element, said first row select line including first and second sub row select lines for receiving the same row select signal, and said second row select line including third and fourth sub row select lines for receiving the same row select signal, said associated internal data input line includes first and second data input lines for receiving the same input data to be processed, said first data input line and said second sub row select line sharing the same signal line and said second data input line and said third sub row select line sharing the same signal line, said first coupling element comprises;

a first switching element as said writing means, responsive to a signal potential on said first sub row select line for connecting one node of its storage means to said second signal line, and a second switching element responsive to a signal potential on said second sub row responsive to a signal potential on said second sub row select line for connecting the other node of its storage means to said first signal line, said second switching element serving also as said storage information transmitting means, and said second coupling element comprises;

a third switching element as said writing means, responsive to a signal potential on said third sub row select line for connecting one node of its storage means to said second signal line, and a fourth switching element responsive to a signal potential on said fourth sub row select line for connecting the other node of its storage means to said first signal line, said third switching element serving also as said storage information transmitting means, said first to fourth sub row select lines receiving a row select signal in said program mode, and said second and third sub row select lines receiving the same input data to be processed in said operation mode.

8. The device according to claim 1, further comprising:

change point detecting means for detecting a change of input data which becomes said input data signal to be processed;

pulse generating means responsive to a detection signal from said change point detecting means for generating a pulse signal having a predetermined interval; and gate means responsive to the pulse signal from said pulse generating means for passing said input data therethrough to said internal data input lines as said input data to be processed, said input data signal to be processed being converted into a one-shot pulse signal.

9. The device according to claim 1, wherein each of said internal data output lines has first and second internal data output lines, further comprising:

change point detecting means for detecting a point of change of input data which becomes said input data signal to be processed; and equalizing means provided to each of said internal data output lines and responsive to a detection signal from said change point detecting means for equalizing potentials on said first and second internal data output lines for a predetermined period.

10. The device according to claim 9, further comprising:

means responsive to the detection signal from said change point detecting means for activating said sense amplifier means after the equalization is completed by said equalizing means.

11. The device according to claim 1, further comprising:

means for feeding back signal potentials on said internal data output lines to said internal data input lines.

12. A neural network device including:

a plurality of internal data input lines each for receiving an input data signal to be processed;

a plurality of internal data output lines arranged in a direction intersecting said internal data input lines, each for transmitting data for output; and a plurality of coupling elements provided at the connections of said internal data input lines and said internal data output lines for coupling with specific coupling strengths which can be programmed in advance said internal data input lines to said corresponding internal data output lines and transmitting data signal potentials between said internal data input lines and said corresponding internal data output lines, comprising:

change point detecting means for detecting a change of input data which becomes said input data signal to be processed;

pulse generating means responsive to a detection signal from said change point detecting means for generating a pulse signal having a predetermined interval; and gate means responsive to the pulse signal from said pulse generating means for passing said input data therethrough to said internal data input lines as said input data signals to be processed, said input data signal to be processed being converted into a one-shot pulse signal.

13. A neural network device including:

a plurality of internal data input lines each for receiving an input data signal to be processed;

a plurality of internal data output lines arranged in a direction intersecting said internal data input lines, each for transmitting data for output; and a plurality of coupling elements provided at the connections of said internal data input lines and said internal data output lines for coupling with specific coupling strengths which can be programmed in advance said internal data input lines to said corresponding internal data output lines and transmitting data signal potentials between said internal data input lines and said corresponding internal data output lines, wherein each of said internal data output lines has first and second internal data output lines, comprising:

change point detecting means for detecting a change of input data which becomes said input data signal to be processed; and equalizing means provided corresponding to each pair of said first and second internal data output lines and responsive to a detection signal from said change point detecting means for equalizing potentials on the corresponding pair of first and second internal data output lines for a predetermined period.

14. The device according to claim 13, further comprising:
sense amplifier means provided corresponding to each said pair of first and second internal data output lines for differentially sensing and amplifying signal potentials on the corresponding pair of first and second internal data output lines to produce an output data signal; and
means responsive to the detection signal from said change point detecting means for activating said sense amplifier means after the equalization is completed by said equalizing means.

15. A method of driving a neural network device which comprises;
a plurality of internal data input lines each for receiving an input data signal to be processed;
a plurality of internal data output lines arranged in a direction intersecting said internal data input lines, each for transmitting data for output; and
a plurality of coupling elements provided at the connections of said internal data input lines and said internal data output lines for coupling with specific coupling strengths which can be programmed in advance said internal data input lines to said corresponding internal data output lines and transmitting data signal potentials between said internal data input lines and said corresponding internal data output lines,
comprising the steps of:
detecting a change of input data which becomes said input data signal to be processed;
in response to said detection of change point, generating a pulse signal having a predetermined time interval; and
in response to the generated pulse signal, gating said input data and transmitting the gated data onto said internal data input lines as said input data signal to be processed, said input data signal to be processed being converted into a one-shot pulse signal.

16. A method of driving a neural network device which comprises;
a plurality of internal data input lines each for receiving an input data signal to be processed;
a plurality of internal data output lines arranged in a direction intersecting said internal data input lines, each for transmitting data for output; and
a plurality of coupling elements provided at the connections of said internal data input lines and said internal data output lines for coupling with specific coupling strengths which can be programmed in advance said internal data input lines to said corresponding internal data output lines and transmitting data signal potentials between said internal data input lines and said corresponding internal data output lines.
each of said internal data output lines including a pair of first and second internal data output lines, comprising the steps of:
detecting a change of input data which becomes said input data to be processed; and
in response to said detection of change point, equalizing potentials on said first and second internal data output lines for a predetermined period.

17. The method according to claim 16, further comprising the step of;
in response to said equalization having been completed, differentially amplifying signal potentials on said first and second internal data output lines to produce output data.

* * * * *